United States Patent
Suzuki

(12) 
(10) Patent No.: US 6,226,026 B1
(45) Date of Patent: May 1, 2001

(54) IMAGE EXPOSING APPARATUS FOR IMAGEWISE EXPOSING ON A LIGHT SENSITIVE MATERIAL COMPRISING AT LEAST ONE LIGHT EMITTING ELEMENT ROW

(75) Inventor: Atsushi Suzuki, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/293,768

(22) Filed: Apr. 19, 1999

(30) Foreign Application Priority Data

Apr. 20, 1998 (JP) .................................................. 10-109233

(51) Int. Cl.[7] ...................................................... B41J 15/14
(52) U.S. Cl. ........................ 347/241; 347/256; 355/113; 359/583
(58) Field of Search ..................................... 347/241, 244, 347/256, 248, 258; 348/758; 355/1, 35, 113, 121; 358/408; 372/42; 359/580, 581, 583, 584, 883

(56) References Cited

U.S. PATENT DOCUMENTS 4,422,098 * 12/1983 Logie et al . .......................... 358/406
4,884,095 * 11/1989 Yamanouchi et al. ..................... 355/1
4,924,261 * 5/1990 Okino ..................................... 355/35
5,990,983 * 11/1999 Hargis et al. .......................... 348/758
6,021,145 * 2/2000 Naiki et al. ............................ 372/43

FOREIGN PATENT DOCUMENTS 58-68060 * 4/1993 (JP) .

* cited by examiner

Primary Examiner—N. Le
Assistant Examiner—Hai C. Pham
(74) Attorney, Agent, or Firm—Finnegan, Henderson, Farabow, Garrett & Dunner, L.L.P.

(57) ABSTRACT

An image exposing apparatus for imagewise exposing on a light-sensitive material, consists of: a plurality of light emitting element rows; a light mixing device for mixing light emitted from the plurality of light emitting element rows to form emergent light in a line in which rays of light are mixed on the same line; and a moving device for moving at least one of the light-sensitive material and the light mixing device, so that an exposure line that is formed when the light-sensitive material is exposed to the emergent light in a line is moved in a direction having a directional component perpendicular to the exposure line.

40 Claims, 24 Drawing Sheets

FIG. 8 (a)
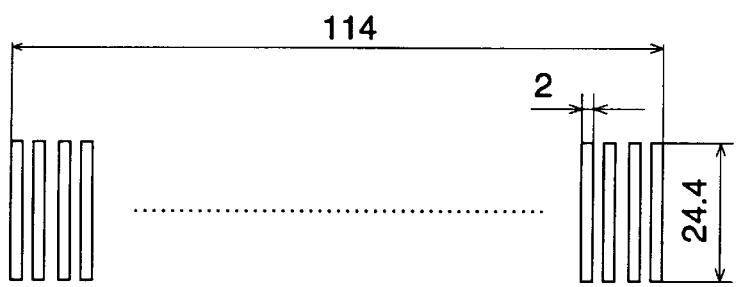
FIG. 8 (b)
FIG. 8 (c)
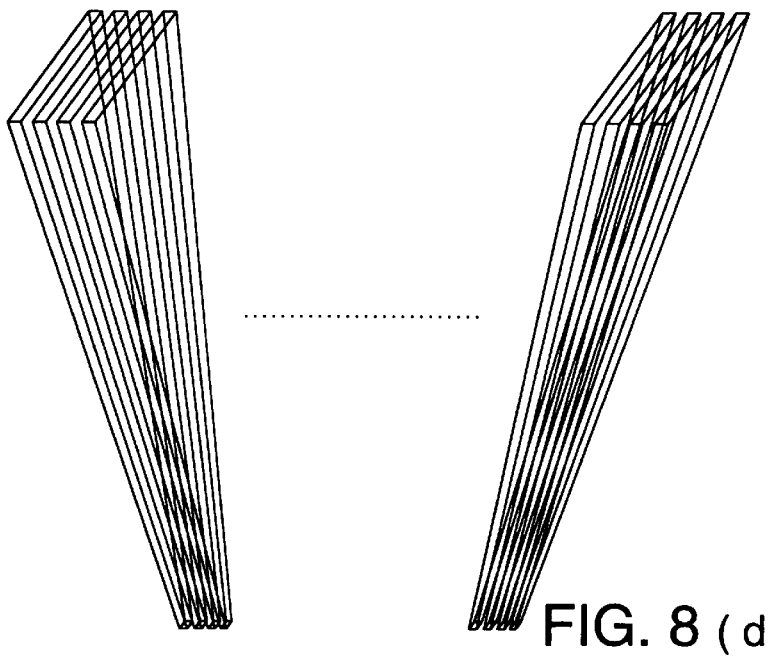
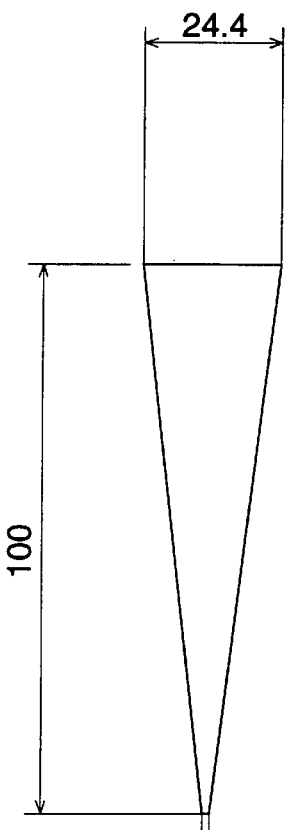
FIG. 8 (d)
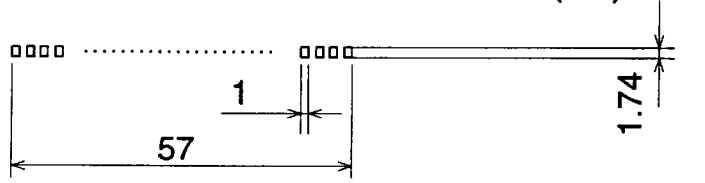

CONVEYANCE DIRECTION

EMERGENT LIGHT IN A LINE HAVING DESIRED DENSITY ature. In the example shown here, each of

IMAGE EXPOSING APPARATUS FOR IMAGEWISE EXPOSING ON A LIGHT SENSITIVE MATERIAL COMPRISING AT LEAST ONE LIGHT EMITTING ELEMENT ROW

BACKGROUND OF THE INVENTION

The present invention relates to an image exposing apparatus to expose a light-sensitive material by using rays of light each being of a different color and being emitted from plural light emitting elements.

There has been an image exposing apparatus which is equipped, for each color to be recorded, with an arrayed light source composed of plural light emitting elements, and is capable of exposing a light-sensitive material (a print material or the like).

FIG. 23 is a schematic diagram showing how exposure is carried out by a conventional image exposing apparatus of the aforementioned type. In this case, there are provided arrayed light sources 1, 2 and 3 each having a width which is nearly the same as that of print material 11, so as to expose the print material 11. In the example shown here, each of arrayed light sources 1–3 is structured to form a pattern of zigzag arrangement of 20 elements×2 rows (40 elements in total).

In this case, each of arrayed light sources 1–3 emits light for each of R, G and B colors to be recorded. When each of arrayed light sources 1–3 is subjected to the driving which is delayed in terms of timing in accordance with the conveyance speed, while print material 11 is being conveyed in the direction as indicated by the arrow, the same position on the print material 11 is exposed to light of R, G and B.

Incidentally, it is preferable that there exists a light source with which emergent light in a line having the desired density shown in FIG. 24 can be obtained simultaneously. For example, when emergent light in a line having a density of 100 dots/line is needed, 100 elements are required for each of R, G and B, and a light source wherein 300 elements in total are arranged in a line is required to be made. Namely, the desired density for a light source for obtaining emergent light of 100 dots/line requires 300 dots/line.

However, it is difficult to arrange all elements on one line as stated above, because the size of a light emitting element is limited. As described above, therefore, it is arranged so as to carry out operations of exposure in succession by providing arrayed light sources for respective colors.

Since a light flux emitted from an arrayed light source is generally diffused, it is necessary to form an image of light from a light source on the surface of a print material or to cause a light source to be in close contact with the print material.

Because of the necessity of this close contact between them and of forming an image of light from the light source on a print material, when an image forming plane is kept apart from the light source, the brightness of an image is lowered. From the practical point of view, therefore, it has been necessary to carry out exposure by shifting positions for arrayed light sources 1–3, as shown in FIG. 23.

When carrying out position-shifted exposure for each color to be recorded, it is necessary to stagger the timing for the driving signal to be supplied to each of the arrayed light sources 1–3, in accordance with the conveyance speed. For this reason, there has been a problem that the structure of a driving circuit and timing control are made to be complicated.

Doubling results when speed variation is caused in a conveyance speed during the period from completion of exposure for a certain color to be recorded to the exposure for another color with regard to the same pixel. To prevent the doubling, therefore, it has been necessary to strictly control the conveyance speed for print material 11.

Since a slight movement of print material 11 in the direction perpendicular to the conveyance plane changes the size of an image of a pixel on the print material and thereby contributes to the occurrence of doubling, it is necessary to accurately maintain the position of the conveyance plane. Due to this, a mechanism to accurately maintain the conveyance plane is needed for each of the three light sources mentioned above, and is further needed to be within a range (range A in FIG. 25) to cover all light sources. Further, there has been needed a mechanism to suppress movement in the direction perpendicular to the conveyance direction in the conveyance plane during the period up to exposure for another color, with regard to the same pixel.

Namely, when arranging arrayed light sources 1–3 for colors to be recorded for conducting recording as shown in FIG. 25, its range A is broadened, and therefore, exposure that is free from doubling and color unevenness has been difficult.

Further, for correcting an exposure amount, it is necessary to provide light-receiving means at positions each corresponding to each recording head and in this case, three light-receiving means are needed, which has been a problem.

Even in each arrayed light source, it is necessary to stagger the timing for the driving signal in the conveyance direction for each row representing the same color, because of the zigzag arrangement of plural rows in each arrayed light source. In this case again, there has been a problem that the structure of a driving circuit and timing control are made to be complicated.

SUMMARY OF THE INVENTION

The invention has been achieved in consideration of the problems stated above, and its object is to provide an image exposing apparatus wherein the structure of a driving circuit and timing control are made to be simple and easy, and no doubling is caused even when the conveyance speed is fluctuated. Another object is to provide an exposure amount correcting method suitable for the image exposing apparatus mentioned above.

Namely, the invention which solves the problems mentioned above is attained by either one of the following Structures (1)–(34).

Structure (1): An image exposing apparatus for conducting image exposure on a light-sensitive material by the use of plural light emitting element rows, wherein there are provided a light mixing means which mixes light emitted from plural light emitting element rows and forms emergent light in a line in which rays of light are mixed on the same line, and a moving means which moves at least one of a light-sensitive material and the light mixing means, so that an exposure line that is formed when the light-sensitive material is exposed to the emergent light in a line may be moved in the direction having a directional component perpendicular to the exposure line.

In this invention, light fluxes emitted from plural arrayed light sources are mixed by the light mixing means to emerge, and thereby an emergent light in a line wherein plural light fluxes are mixed can be formed. Therefore, light fluxes from each arrayed light source are bound into one, and exposure is carried out as one line. Thus, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Structure (2): An image exposing apparatus for conducting image exposure on a light-sensitive material by the use of plural light emitting element rows, wherein there are provided a light mixing means which mixes rays of light emitted from the plural light emitting element rows and causes emergent light in a line in which rays of light are mixed on the same line to emerge through the same path, and a light converging means which converges on a light-sensitive material a light flux emerging from the light mixing means through the same path.

In this invention, light fluxes from plural arrayed light sources are mixed by a light mixing means and emerge through the same path, and this emergent light is converged on a light-sensitive material by a light converging means, thus an emergent light in a line wherein plural light fluxes are mixed can be formed.

It is therefore possible to materialize an image exposing apparatus wherein the mechanism to maintain the conveyance plane is simple, and the structure of a driving circuit and timing control are made to be easy, and no doubling is caused even when the conveyance speed is fluctuated or movement in the direction perpendicular to the conveyance direction in the conveyance plane is caused.

Further, since the light-sensitive surface of a light-sensitive material can be positioned to be away from an emergent outlet for the light flux stated above, it is possible to prevent occurrence of scratches on the light-sensitive surface and a jam which is easily caused when the light-sensitive material enters.

Structure (3): The image exposing apparatus described in either Structure (1) or (2) wherein the light mixing means is one to mix light fluxes emitted from light emitting element rows for the same color to be recorded, and the light mixing means in quantity corresponding to the plural colors to be recorded are provided.

In this invention, light fluxes for the same color to be recorded emitted from arrayed light sources are collected into one, and exposure is conducted as one line. When making the exposure amount to be greater than usual, therefore, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Structure (4): The image exposing apparatus described in either Structure (1) or (2) wherein the light mixing means is one to mix light fluxes emitted from light emitting element rows for colors to be recorded each being of a different wavelength and the light mixing means in plural quantity are provided.

In this invention, light fluxes for different colors to be recorded emitted from arrayed light sources are bound into one, and exposure is conducted as one line, and the same light mixing means in plural quantity are provided. When making the exposure amount to be greater than usual, therefore, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Structure (5): The image exposing apparatus described in either one of Structures (1)–(4) wherein the light mixing means is provided with plural incident inlets which receive light fluxes in plural rows, a mixing member which mixes light fluxes coming through the plural incident inlets in light transmissible substances or light diffusible substances, and an emergent outlet through which the mixed light fluxes emerge.

In this invention, a light flux of each color to be recorded entering through each of plural incident inlets is mixed by the mixing member through transmission or diffusion, and emerges through the emergent outlet through the same path, thus, there is formed an emergent light in a line wherein plural light each being of a different color are mixed, and this emergent light in a line is converged by a light converging means on a light-sensitive material.

Therefore, light fluxes emitted from each arrayed light source for each color to be recorded are bound into one, and exposure is conducted as one line. Therefore, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Structure (6): The image exposing apparatus described in Structures (5), wherein the mixing member is composed of plural disks.

In this invention, there is made an arrangement wherein light fluxes are mixed by plural disks, which makes light fluxes to be mixed easily.

Structure (7): The image exposing apparatus described in Structure (5), wherein the mixing member is structured in such a way that plural elliptical bodies each being formed to have plural incident inlets and a single emergent outlet are laminated.

In this invention, plural light fluxes are mixed by the plural elliptical bodies, which makes it easy to mix light fluxes, and further makes it possible to minimize a loss of light quantity.

Structure (8): The image exposing apparatus described in either one of Structures (1)–(4) wherein the light mixing means is a plate which is provided with plural incident inlets which receives light fluxes in plural rows, a mixing member which conducts propagation and mixing causing these plural light fluxes from incident inlets to be subjected to total reflection on a boundary, and an emergent outlet through which the mixed light fluxes emerge, the aforesaid plate is one structured to be of plural laminated sheets, and the plural incident inlets are formed to be branched out into one or more.

In this invention, a light flux of each color to be recorded entering through each of plural incident inlets is mixed while being subjected to total reflection on a boundary of the mixing member and thereby to propagation, and emerges through the emergent outlet through the same path, thus, there is formed an emergent light in a line wherein plural light each being of a different color are mixed, and this emergent light in a line is converged by a light converging means on a light-sensitive material.

Therefore, light fluxes emitted from each arrayed light source for each color to be recorded are bound into one, and exposure is conducted as one line. Therefore, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Further, in this invention, it is possible to mix light fluxes which hardly have loss, with regard to light fluxes having the angular aperture which is not more than that causing total reflection, because propagation of light is carried out by total reflection.

Incidentally, it is possible that plural incident inlets are structured to be branched in the light mixing means.

Structure (9): The image exposing apparatus described in either one of Structures (5)–(7) wherein a light flux diffused on the emergent outlet is caused to form an image on the position which is optically different.

In this invention, a light flux diffused on the emergent outlet is caused to form an image on the position which is optically different, through an image forming means such as a SELFOC lens array, and a light-sensitive material does not need to be in close contact with a light source, accordingly. It is therefore possible to make maintenance of the conveyance plane to be more easy.

Structure (10): The image exposing apparatus described in either one of Structures (1)–(4) wherein the light mixing means has a wavelength selective optical member which transmits light or reflects light in accordance with a wavelength of the light.

In this invention, it is not necessary to use a means to mix light through diffusion thereof, because light fluxes are mixed through transmission or refection of light conducted selectively in accordance with a wavelength. It is therefore possible to materialize an image exposing apparatus having less loss of light quantity.

Structure (11): The image exposing apparatus described in either one of Structures (1)–(4) wherein the light mixing means represents a dichroic prism and a SELFOC lens array.

This invention is one which causes an image of an array light source to be formed on a light-sensitive material without using a means to mix light through diffusion thereof, and it is possible to materialize an image exposing apparatus wherein a loss of light quantity is made to be less by a dichroic prism and a SELFOC lens array which represent a short optical system.

In this invention, a light flux coming from the dichroic prism is caused by the SELFOC lens array to form an image on the position which is optically different, and thereby a light-sensitive material does not need to be in close contact with a light source. It is therefore possible to make maintenance of the conveyance plane to be more easy.

Structure (12): The image exposing apparatus described in either one of Structures (1)–(4) wherein the light mixing means represents a dichroic mirror and a SELFOC lens array.

This invention is one which causes an image of an array light source to be formed on a light-sensitive material without using a means to mix light through diffusion thereof, and it is possible to materialize an image exposing apparatus wherein a loss of light quantity is made to be less by a dichroic mirror and a SELFOC lens array which represent a short optical system.

In this invention, a light flux reflected on the dichroic mirror is caused by the SELFOC lens array to form an image on the position which is optically different, and thereby a light-sensitive material does not need to be in close contact with a light source. It is therefore possible to make maintenance of the conveyance plane to be more easy.

Structure (13): The image exposing apparatus described in either one of Structures (1)–(4) wherein the light mixing means is provided with a prism having no characteristics dependent on wavelength of light.

This invention is one which causes an image of an array light source to be formed on a light-sensitive material without using a means to mix light through diffusion thereof, and it is possible to materialize an image exposing apparatus wherein a loss of light quantity is made to be less by the short optical system employing a prism.

Structure (14): The image exposing apparatus described in either one of Structures (1)–(4) wherein the light mixing means is composed of an aggregate of optical fiber which mix light fluxes coming from plural incident inlets to transmit them.

Structure (15): The image exposing apparatus described in Structures (1) through (14), wherein the light emitting element row is one composed of plural light emitting elements each of which can be controlled independently for each pixel in terms of light emitting, or of a light emitting means wherein shutter means each of which can be controlled independently at a single light emitting section and a section corresponding to a pixel are combined, and it is provided with light emitting element rows for plural colors corresponding to colors to be recorded.

In this invention, a light emitting element row composed of a large number of LEDs or VFPH equipped with a single light emitting section and a shutter section can be used as the light emitting element row, and thereby a light flux having appropriated intensity in accordance with a wavelength can be obtained. It is therefore possible to materialize an image exposing apparatus which can be controlled easily.

Structure (16): The image exposing apparatus described in Structures (1) through (4), wherein the light emitting element row is one composed of plural light emitting elements each of which can be controlled independently for each pixel in terms of light emitting, or of a light emitting means wherein shutter means each of which can be controlled independently at a single light emitting section and a section corresponding to a pixel are combined, and the light emitting element row realizes emission of plural colors corresponding to colors to be recorded, using the wavelength with which the wavelength selective optical member transmits light or reflects light selectively.

In this invention, when using a light emitting element row composed of a large number of LEDs or VFPH equipped with a single light emitting section and a shutter section as the light emitting element row, it is possible to determine the color to be recorded by the wavelength selective optical member. It is therefore possible to obtain a light flux having appropriate intensity in accordance with a wavelength, and it is possible to materialize an image exposing apparatus which can be controlled easily.

Structure (17): The image exposing apparatus described in Structures (1) through (4), wherein the light emitting element row, wherein the light emitting element row is one composed of plural light emitting elements each of which can be controlled independently for each pixel in terms of light emitting, or of a light emitting means wherein shutter means each of which can be controlled independently at a single light emitting section and a section corresponding to a pixel are combined, and it is provided with light emitting element rows for the same color to be recorded.

In this invention, light fluxes for the same color to be recorded which are emitted from each array light source are bound into one, and exposure is carried out as one line. Therefore, when making the exposure amount to be greater than usual, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Structure (18): An image exposing apparatus having therein a light mixing means which mixes light emitted from the plural light emitting element rows, and forms an emergent light in a line mixed on one line, and a moving means which moves at least one of a light-sensitive material and the aforesaid light mixing means in a way that an exposure line moves in the direction having the component perpendicular to the exposure line formed when a light-sensitive material is exposed to the emergent light in a line, wherein there are provided a light transmitting means which causes light fluxes emitted from the plural light emitting element rows to transmit on incident inlets of the light mixing means, and an image forming means which causes emergent light diffused from the emergent outlet on the light mixing means to form images on a light-sensitive material.

In this invention, since each of light emitting element rows employs the light transmitting means to transmit light on the light mixing means, the depth of focus of the transmitting means makes it easy to adjust an image forming position for each light emitting element means. Further, the restriction of the size of the light mixing means caused by the physical size of the arrayed light source can be eased.

Further, since the image forming means is used to form an image on a light-sensitive material, the depth of focus makes it easy to adjust. As a result, it is possible to materialize an image exposing apparatus wherein a mechanism to maintain the conveyance plane is simple, and no doubling is caused even when the movement in the direction perpendicular to the conveyance direction in the conveyance plane is caused.

Structure (19): The image exposing apparatus described in Structure (18), wherein the plural light emitting element rows emit light of the same wavelength at the same timing.

In this invention, light fluxes for the same color to be recorded which are emitted from each array light source are bound into one, and exposure is carried out as one line. Therefore, when making the exposure amount to be greater than usual, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Structure (20): The image exposing apparatus described in Structure (18), wherein the plural light emitting element rows emit light of the different wavelengths at the same timing.

In this invention, a light flux of each color to be recorded entering through each of plural incident inlets is mixed by the mixing member through transmission or diffusion, and emerges through the emergent outlet through the same path, thus, there is formed an emergent light in a line wherein plural light each being of a different color are mixed, and this emergent light in a line is converged by a light converging means on a light-sensitive material.

Therefore, light fluxes emitted from each arrayed light source for each color to be recorded are bound into one, and exposure is conducted as one line. Therefore, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

It is further possible to minimize the phenomenon of emission of unwanted color which is caused by side absorption of a light-sensitive material, because light fluxes of plural colors to be recorded are mixed to emerge at the same timing.

Structure (21): The image exposing apparatus described in Structure (18), wherein chromatic aberration of the lens of the image forming means is within 800 $\mu$m between the longest wavelength and the shortest wavelength of the plural light emitting element rows.

In this invention, it is possible to keep high image quality even when a light-sensitive material vibrates when it is conveyed, because the chromatic aberration between the longest wavelength and the shortest wavelength of mixed light fluxes which emerge from the light mixing means is within a prescribed value.

Structure (22): The image exposing apparatus described in Structure (18), wherein the light mixing means is provided with plural incident inlets which receive light fluxes in plural rows, a mixing member which mixes light fluxes coming from the plural incident inlets in light transmissible substances or light diffusible substances, and an emergent outlet through which the mixed light fluxes emerge.

In this invention, a light flux of each color to be recorded entering through each of plural incident inlets is mixed by the mixing member through transmission or diffusion, and emerges through the emergent outlet through the same path, thus, there is formed an emergent light in a line wherein plural light each being of a different color are mixed, and this emergent light in a line is converged by a light converging means on a light-sensitive material.

Therefore, light fluxes emitted from each arrayed light source for each color to be recorded are bound into one, and exposure is conducted as one line. Therefore, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Structure (23): The image exposing apparatus described in Structure (18), wherein the light mixing means has therein a wavelength selective optical member which selectively transmits or reflects depending on a wavelength of light.

In this invention, it is not necessary to use a means to mix light through diffusion because light fluxes are mixed through transmission or reflection selectively in accordance with a wavelength, and it is possible to materialize an image exposing apparatus wherein a loss of light is slight.

Structure (24): The image exposing apparatus described in Structure (22), wherein an angular aperture of the image forming means is not smaller than that of the light transmitting means.

In this invention, light fluxes mixed and emerge can be handled effectively, and it is possible to minimize a loss of light quantity, because an angular aperture of the image forming means is great.

Structure (25): The image exposing apparatus described in Structure (22), wherein a focal length of the image forming means is not smaller than that of the light transmitting means.

In this invention, the apparatus is highly resistant to fluctuation of focus positions, an adjustment is easy, and an influence of vibration of a light-sensitive material is small, because a focal length of the image forming means is great.

Structure (26): The image exposing apparatus described in Structure (22), wherein each of the plural light emitting element rows emits light having a different wavelength, and one of the different wavelengths corresponds to green, and a light flux of that green color is reflected at least once by the wavelength selective optical member.

In this invention, when mixing light fluxes of different wavelengths through reflection or transmission, the light flux of green which is easy to adjust and is highly resistant to fluctuation is arranged to be reflected. Therefore, adjustment of the image exposing apparatus is easy.

Structure (27): The image exposing apparatus described in Structure (22), wherein each of the plural light emitting element rows emits light having a different wavelength, and one of the different wavelengths corresponds to blue, and a light flux of that blue color is transmitted through the wavelength selective optical member.

In this invention, when mixing light fluxes of different wavelengths through reflection or transmission, the light flux of blue color which is difficult to adjust is not reflected but is transmitted. Therefore, adjustment of the image exposing apparatus is easy.

Structure (28): The image exposing apparatus described in Structure (1) through (26), wherein there are provided a light-receiving means which receives the emergent light in a line and measures an amount of light emitted from each pixel of the light emitting element rows, a correction amount calculating means which obtains an amount of correction from an amount of light emitted from each pixel measured by the light-receiving means, and a control means which corrects an amount of light emitted from each pixel in accordance with the amount of correction obtained by the correction amount calculating means.

In this invention, when mixing plural light fluxes to conduct exposure, mixed light fluxes are used to measure an amount of emitted light. Therefore, it is not necessary to provide plural light-receiving means for colors to be recorded, but a single light-receiving means is enough, and the mechanism can be simplified.

Structure (29): The image exposing apparatus described in Structure (28), wherein light emitting element rows for the plural colors to be recorded are caused to emit light simultaneously, then emergent light in a line in that case is subjected to color separation to receive light for each color to be recorded, and an amount of correction for each pixel for each color to be recorded is calculated simultaneously.

In this invention, when mixing plural light fluxes to conduct exposure, light fluxes mixed at the same timing are used, and thereby color separation and measurement of an amount of emitted light for each color to be recorded are conducted simultaneously. Therefore, correction of exposure amount can easily be carried out at a time.

Structure (30): An exposure amount correcting method for an image exposing apparatus having therein a light mixing means which mixes light emitted from plural light emitting element rows, and forms emergent light in a line wherein light of plural colors are mixed on the same line, a light mixing means which mixes light emitted from plural light emitting elements for plural colors and forms emergent light in a line mixed on the same line, and a moving means which moves at least one of a light-sensitive material and the light mixing means so that an exposure line which is formed when a light-sensitive material is exposed to the emergent light in a line may be moved in the direction having the component perpendicular to the exposure line, wherein lines for density reading for plural colors to be recorded are formed by plural light emitting element rows, then, each of lines for density reading is read by the same reading element by the use of a flat-bed scanner, and thereby an amount of correction for each pixel for each color to be recorded is calculated.

In this invention, with regard to lines for density reading, each line for each color to be recorded is kept to be in parallel with others, and thereby, adjustment of plural lines for density reading in terms of parallelism can be made easily, thus, an accurate amount of correction can be obtained from accurate density reading.

Namely, in the past, it has been difficult to materialize an arrayed light source of one line for obtaining emergent light having desired density and desired amount of exposure, because of physical restriction for the size of a light emitting element, and therefore, an arrayed light source for each color or am arrayed light source of plural lines for the same color has been used for conducting exposure. In the case of the invention described in Structures (1) through (29) above, however, it is possible to form emergent light in a line having desired density and desired amount of light wherein plural light fluxes are mixed on the same line.

Therefore, timing adjustment for arranging each color in R, G and B which has been necessary in a conventional apparatus and a mechanism to restrain movement in the direction perpendicular to the conveyance direction in the conveyance plane for conducting exposure of each color are not needed in the image exposing apparatus of the invention, thus, the structure and control can be simplified, and high image quality can be materialized.

Structure (31): The image exposing apparatus described in either one of Structures (1)–(20), wherein an image forming means which makes emergent light diverging from the emergent outlet of the light mixing means to form an image on a light-sensitive material is provided, and chromatic aberration of the lens of the image forming means is within the depth of focus.

In the invention, it is possible to maintain high image quality because chromatic aberration between the shortest wavelength and the longest wavelength of the mixed light flux emerging from the light mixing means is within the depth of focus.

Structure (32): The image exposing apparatus described in Structures (27), wherein an arrangement is made so that a green light flux is reflected once on the wavelength selective optical member.

In this invention, when mixing while making light fluxes each having a different wavelength to be reflected or transmitted, green light having the greatest influence on vision is reflected only once to minimize deterioration. Therefore, it is possible to maintain excellent functions as an image exposing apparatus.

Structure (33): An image exposing apparatus to expose an image on a light-sensitive material by using light emitting element rows, wherein a light diverging means which is provided with at least one incident inlet and two or more emergent outlets and diverges light from the light emitting element rows, and makes emergent light for exposure and emergent light for measurement of light emission intensity of the light emitting element rows to emerge, and light-receiving element rows arranged on at least one of the aforesaid emergent outlets for measuring light emission intensity of the light emitting element rows are provided.

In this invention, stable exposure can be conducted because a quantity of light can be controlled by the use of light diverged by the light diverging means.

Structure (34): An image exposing apparatus to expose an image on a light-sensitive material by using plural light emitting element rows, wherein there is provided a light mixing means which mixes light emitted from plural light emitting element rows and forms a linear emergent light mixed on the same line, the light mixing means stated above is one having a wavelength selective optical member which is selectively transmitted or reflected in accordance with the wavelength of light, and light-receiving element rows detecting light reflected or transmitted by the wavelength selective optical member is provided.

In this invention, it is possible to conduct stable exposure because a quantity of light can be controlled by the use of light transmitted or reflected when mixing with a light mixing means.

BRIEF DESCRIPTION OF THE DRAWINGS

FIGS. 8($a$) through 8($d$) are structure diagrams showing the structure of the image exposing apparatus in the third embodiment of the invention.

DETAILED DESCRIPTION OF THE PREFERRED EMBODIMENT

An embodiment of the invention will be explained in detail as follows. Incidentally, the invention is not limited to the embodiment described herein.

(First embodiment)

The overall structure of an image exposing apparatus used in the first embodiment will be explained as follows, making reference to FIGS. 1 and 2.

Figure 1:
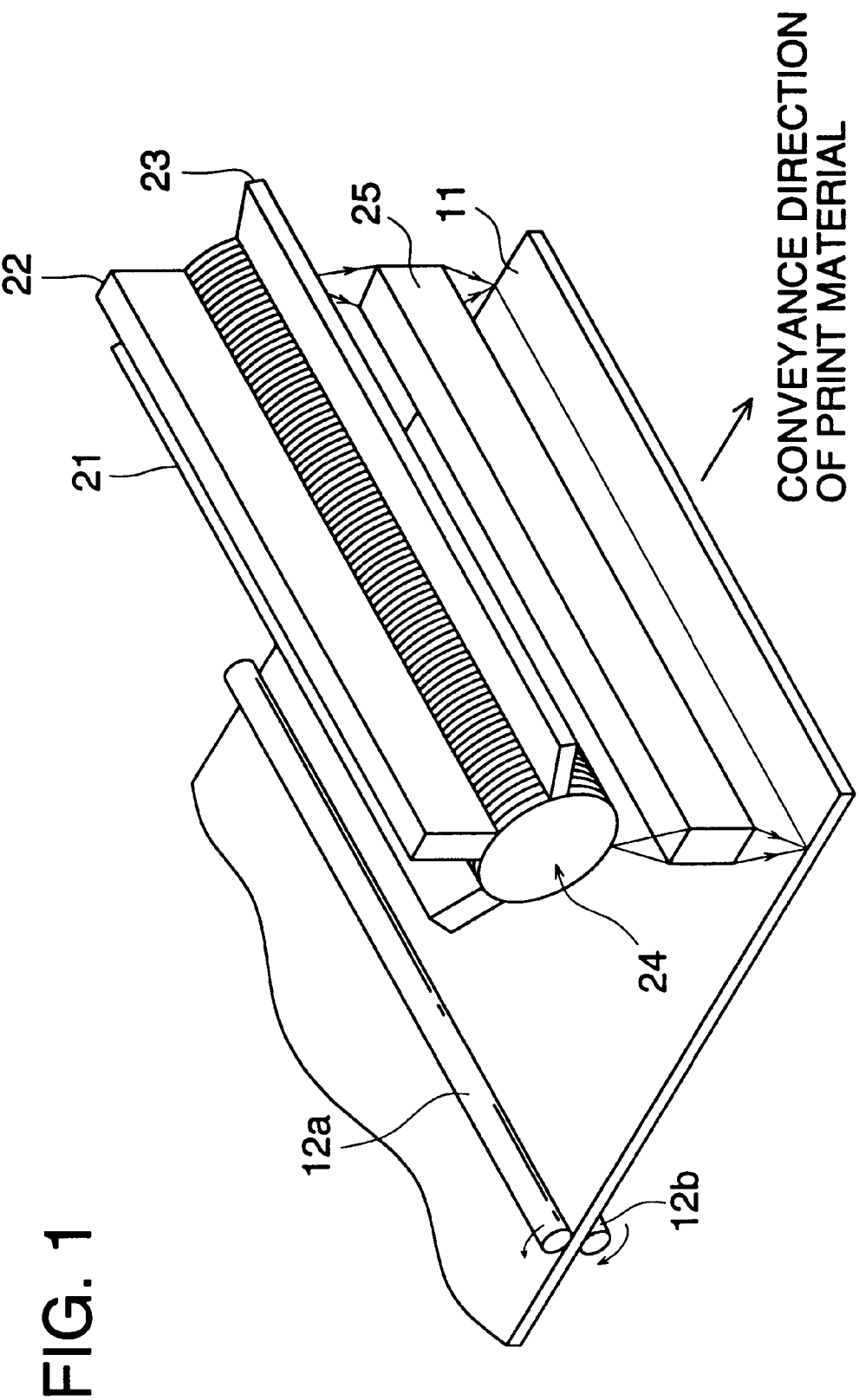
FIG. 1 is a perspective view showing the structure of primary portions of an image exposing apparatus in the first embodiment of the invention.
Figure 2:
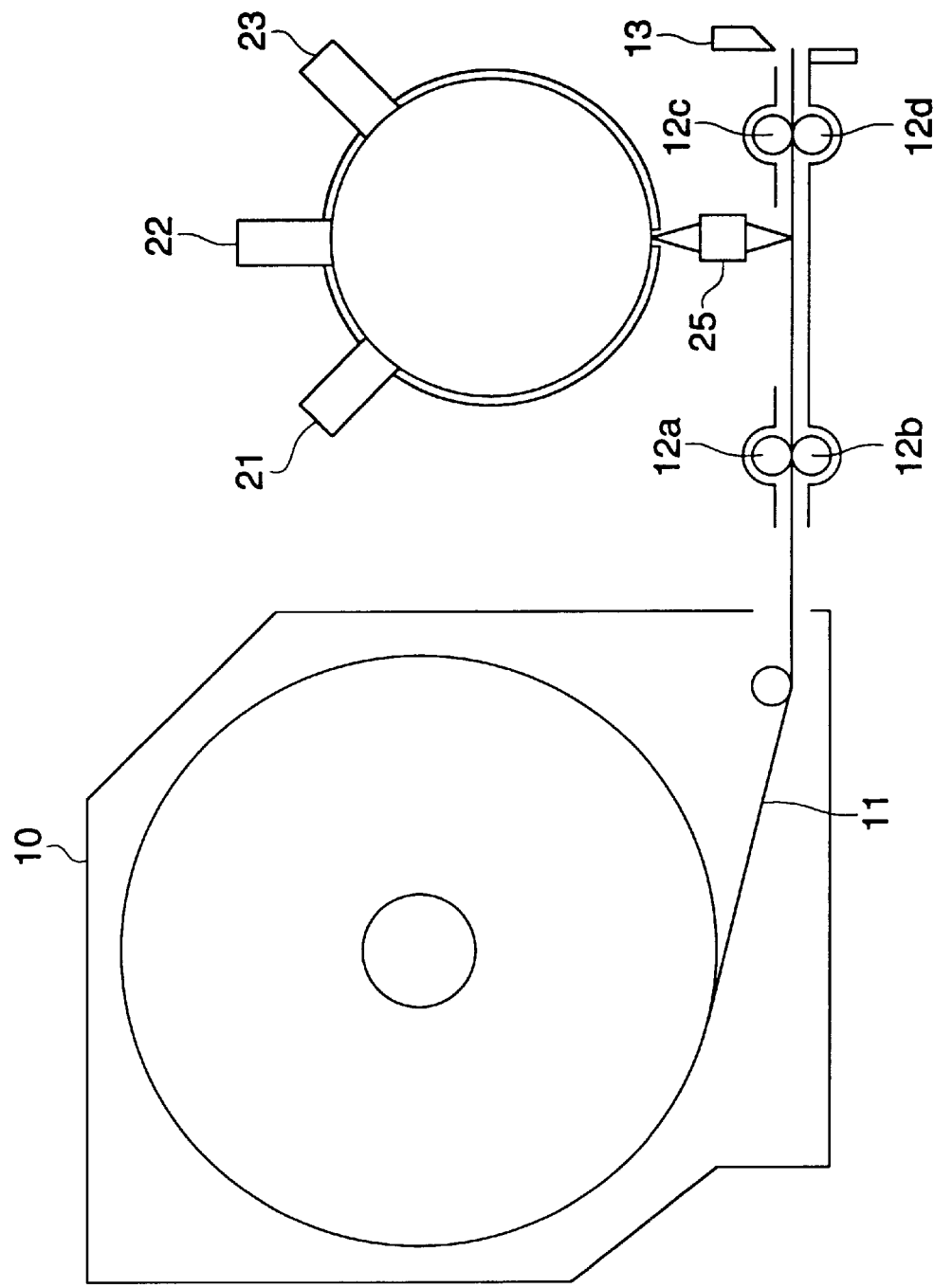
FIG. 2 is a side view showing the overall structure of an image exposing apparatus in the first embodiment of the invention.

FIG. 1 is a perspective view showing the primary portions of the image exposing apparatus in the first embodiment, and FIG. 2 is a side view showing the overall structure of the image exposing apparatus in the first embodiment.

In FIGS. 1 and 2, the numeral 10 represents a paper magazine which holds roll-shaped print material 11, both 12$a$ and 12$b$ represent a pair of driving rollers which convey print material 11 at a prescribed conveyance speed, 12$c$ and 12$d$ represent a pair of driving rollers to convey print material 11 at a prescribed conveyance speed, and the numeral 13 represents a cutter which cuts the exposed print material into a prescribed size.

Incidentally, print material 11 in the present embodiment is one of light-sensitive materials, and it is assumed in the first embodiment that the exposure conducted on the print material 11 is used as a concrete example.

Further, the numeral 21 represents a first arrayed light source which is structured with array-shaped light emitting elements and conducts exposure for the first color (for example, R), 22 represents a second arrayed light source which is structured with array-shaped light emitting elements and conducts exposure for the second color (for example, G), 23 represents a third arrayed light source which is structured with array-shaped light emitting elements and conducts exposure for the third color (for example, B), 24 represents an integrating disk cylinder serving as a light mixing means which mixes a light flux emitted from an arrayed light source for each color to be recorded and causes the light flux for each color to be recorded to be emerged through the same path, and 25 represents a SELFOC lens array serving as a light converging means which converges the light flux for each color to be recorded emerging from the integrating disk cylinder 24 on the light-sensitive material.

Incidentally, let it be assumed that the first arrayed light source 21—the third arrayed light source 23 are structured with an arrayed light source having a pattern of zigzag arrangement which is the same as a conventional arrayed light source. Further, the integrating disk cylinder 24 is composed of plural incident inlets (three incident inlets in this case) which receive light fluxes for the colors to be recorded, a mixing member which mixes light fluxes coming from the plural incident inlets in light transmissible substances or light diffusible substances, and with an emergent outlet through which the mixed light fluxes emerge.

Incidentally, the arrayed light source in this case means a light emitting element row wherein light emitting can be controlled at the part corresponding to each pixel, independently, and for example, it is possible to use a light emitting means (VFPH or the like) wherein a shutter means which can be controlled at the portion corresponding to an pixel independently and a single light emitting means are combined, in addition to a light emitting element row composed of plural light emitting elements (LED or the like) each of which can be controlled in terms of light emission for pixel independently.

For the purpose of transmitting the emission from each of the arrayed light sources 21–23 on a high fidelity basis when conducting light mixing, integrating disk cylinder 24 is structured with integrating disks 240 in a quantity that is the same as or more than the number of light emitting elements in each arrayed light source.

Figure 3:
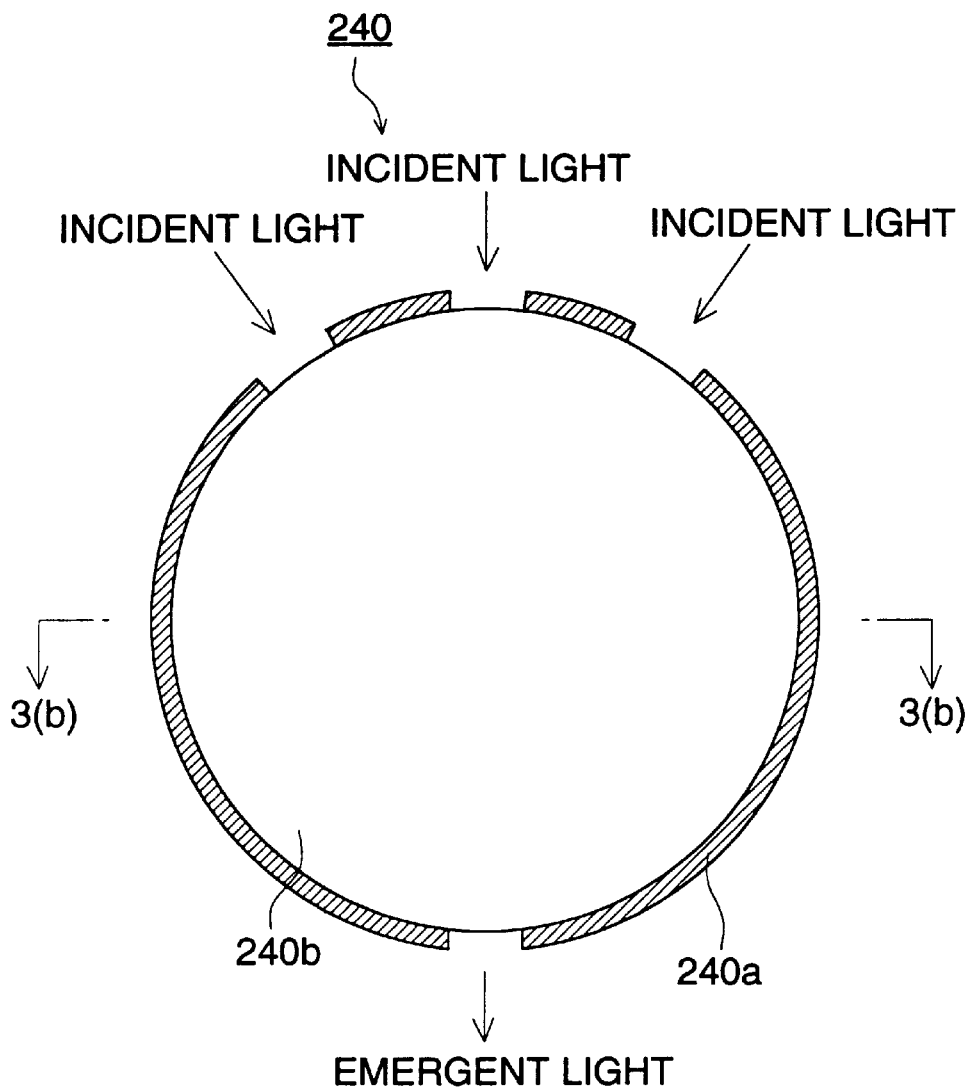
FIG. 3($a$) and 3($b$) respectively represent a front view and a sectional view both showing the structure of an integrating disk which is a primary portion of an image exposing apparatus in the embodiment of the invention.
Figure 3:
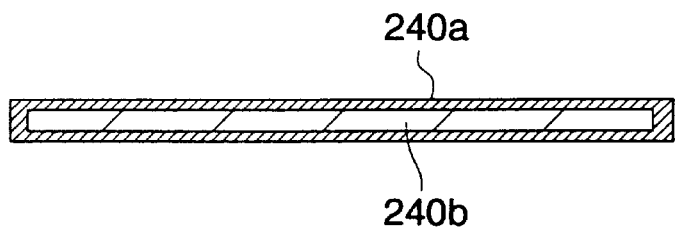

Incidentally, the integrating disks 240 constituting the integrating disk cylinder 24 is composed of light transmitting disk 240b which mixes light through reflection or diffusion in light transmitting substances or light diffusing substances, and of reflecting film 240a provided on a circumferential surface of the light transmitting disk 240b excluding its incident inlets and emergent outlet, as shown in FIG. 3(*a*).

Incidentally, the integrating disk has a thickness which is necessary for light emitted from the light source to be transmitted through the integrating disk, and both sides of the integrating disk, each coming in contact with an adjoining integrating disk, are covered with reflecting films 240a, as shown in FIG. 3(*b*), representing a sectional view taken on line 3(*b*)—3(*b*) in FIG. 3(*a*). Due to this, mixing of light between adjoining integrating disks is prevented.

Incidentally, it is also possible to form a reflecting surface by the use of a difference of an index of refraction. In such a case, it is necessary to provide, between adjoining integrating disks, a light absorber which absorbs light leaked by light component exceeding the total reflection angle.

On incident inlets of the integrating disk 24, there are respectively attached first arrayed light source 21, second arrayed light source 22 and third arrayed light source 23. It is so arranged that emergent light emerging through the emergent outlet of the integrating disk 24 is converged by SELFOC lens array 25 on print material 11 to expose the same.

Figure 4:
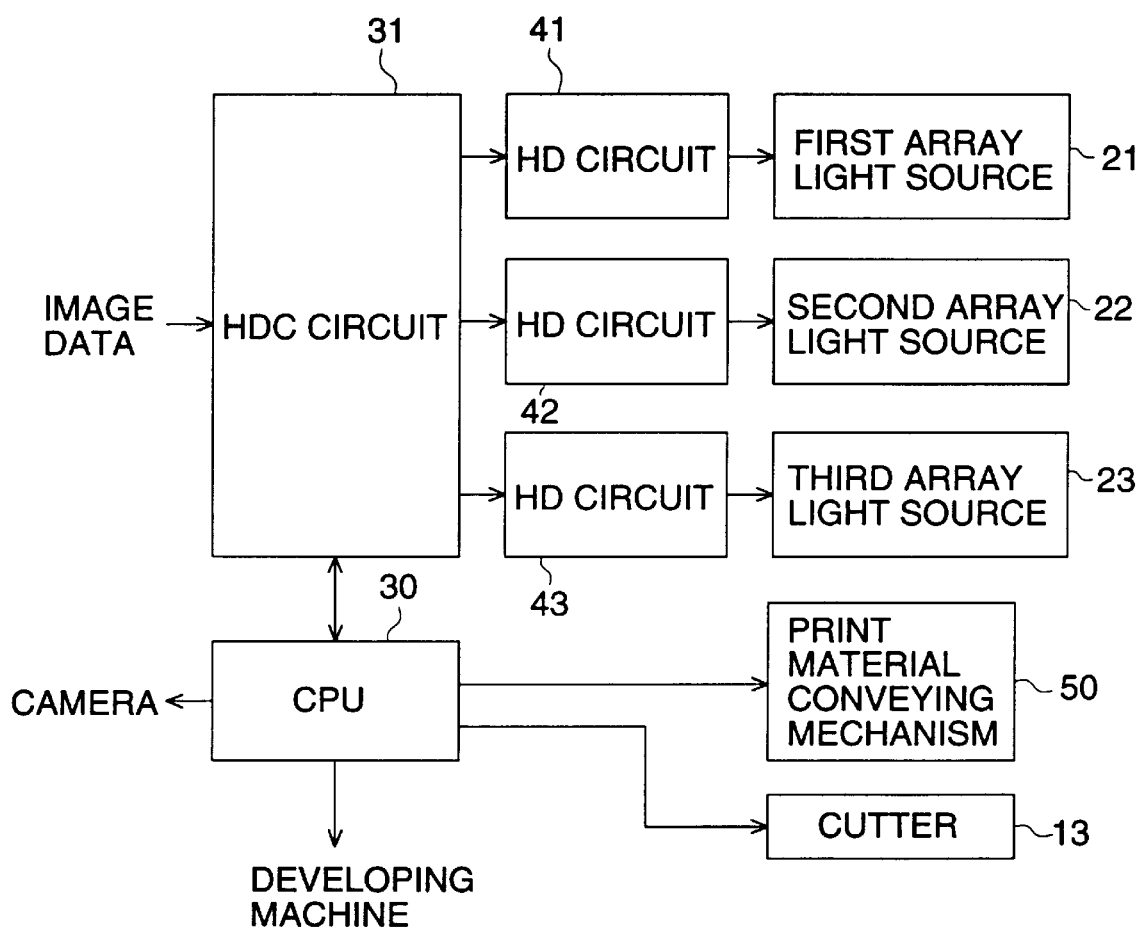
FIG. 4 is a functional block diagram showing the overall electrical structure of an image exposing apparatus in the embodiment of the invention.

FIG. 4 is a functional block diagram showing the electrical structure of an image exposing apparatus in the present embodiment. Incidentally, items in FIG. 4 which are the same as those in FIGS. 1 through 3(*b*) explained already are given the same numbers.

In FIG. 4, the numeral 50 represents CPU serving as a control means which controls various portions, 31 represents a head driver control circuit (HDC circuit) which receives image data from an outside source and generates image signals for driving an arrayed light source for each color, 41 represents a head driver circuit (HD circuit) which receives image signals of the first color coming from the HDC circuit 31 and generates emission signals which cause a light emitting element of the first arrayed light source 21 to emit light in accordance with the gradation, 42 represents a head driver circuit (HD circuit) which receives image signals of the second color coming from the HDC circuit 32 and generates emission signals which cause a light emitting element of the second arrayed light source 22 to emit light in accordance with gradation, 43 represents a head driver circuit (HD circuit) which receives image signals of the third color coming from the HDC circuit 33 and generates emission signals which cause a light emitting element of the third arrayed light source 23 to emit light in accordance with gradation, and 50 represents a print material conveying mechanism which is composed of a driving motor and driving rollers 12a, 12b, 12c and 12d.

Now, operations of the exposing apparatus of the first embodiment structured as stated above will be explained.

First of all, CPU 30 makes the print material conveying mechanism 50 to feed out print material 11 at the prescribed speed.

Then, color image data coming from an external camera or an image processing circuit are decomposed into image signals for each color in HDC circuit 31 in FIG. 4. In this case, emission timing for each color has been staggered in the prior art, in accordance with the location of the arrayed light source and the conveyance speed for print material 11. However, it is not necessary to stagger the timing in the present embodiment. Namely, image signals for each color are supplied to HD circuits 41–43 at the same timing. For example, HDC circuit 31 conducts color separation into R, G and B, and supplies R image signals, G image signals and B image signals.

Each of HD circuits 41–43 which have received image signals for each color at the same timing receives image signals for each color coming from HDC circuit 31, and generates emission signals which cause a light emitting element of the arrayed light source to emit light in accordance with gradation of the image signals. Then, first arrayed light source 21 through third arrayed light source 23 which have received the emission signals from the HD circuits 41–43 emit light in accordance with image signals for each color at the same timing.

Incidentally, in the first embodiment, light emissions are carried out at the same timing for colors of R, G and B when exposure is conducted, and light emissions are carried out at the same timing also for rows each being of a zigzag arrangement in an arrayed light source for each color.

Light emitted from each of the first arrayed light source 21 through third arrayed light source 23 at the same timing enters integrating disk cylinder 24 through each of plural incident inlets. Then, the light is diffused in the inside of a light transmitting disk in each integrating disk 240 constituting the integrating disk cylinder 24, and is reflected repeatedly on the inner surface of reflecting film 240a, thereby, plural incident lights are mixed and emerge through an emergent outlet as emergent lights.

Namely, incident light coming from each of the first arrayed light source 21 through the third arrayed light source 23 each being of a zigzag arrangement is mixed with the others, and thereby, in the emergent lights from the emergent outlet, each arrayed light source is so structured that it is aligned even when it is composed of plural rows, and in addition, there is obtained light in a line wherein each of R, G and B arrayed light sources is aligned and light of each color is emitted at the same time.

Namely, up to this time, there have been required timing adjustment which is needed by each arrayed light source that is composed of plural rows, timing adjustment for arrangement of R, G and B colors, and a mechanism to restrain the movement in the direction perpendicular to the conveyance direction in the conveyance plane where exposure of each color is carried out, all of which are not needed in the first embodiment.

Therefore, a light flux from an arrayed light source for each color to be recorded is put together with others, and exposure is carried out as one line. Therefore, it is possible to materialize an image exposing apparatus wherein the structure of a driving circuit and timing control are made to be easy and no doubling is caused, even when the conveyance speed is fluctuated.

In the image exposing apparatus of the present embodiment, light fluxes can be mixed easily because the light fluxes are mixed by means of integrating disk cylinder 24 which is composed of plural light transmitting disks 240b.

Namely, in spite of a light flux which is highly diffusible unlike a light beam that travels far away without diffusing like a laser beam, it is possible to make the light flux from each arrayed light source to coincide with others on print material 11.

Further, it is possible to minimize the phenomenon that light of another color is emitted on an unwanted basis by a phenomenon called side absorption of alight-sensitive material.

Incidentally, print material 11 which has been subjected to exposure based on image data is cut by cutter 13 to a prescribed size, and then is developed by a developing machine which is out of the diagram.

(Second embodiment)

Figure 5:
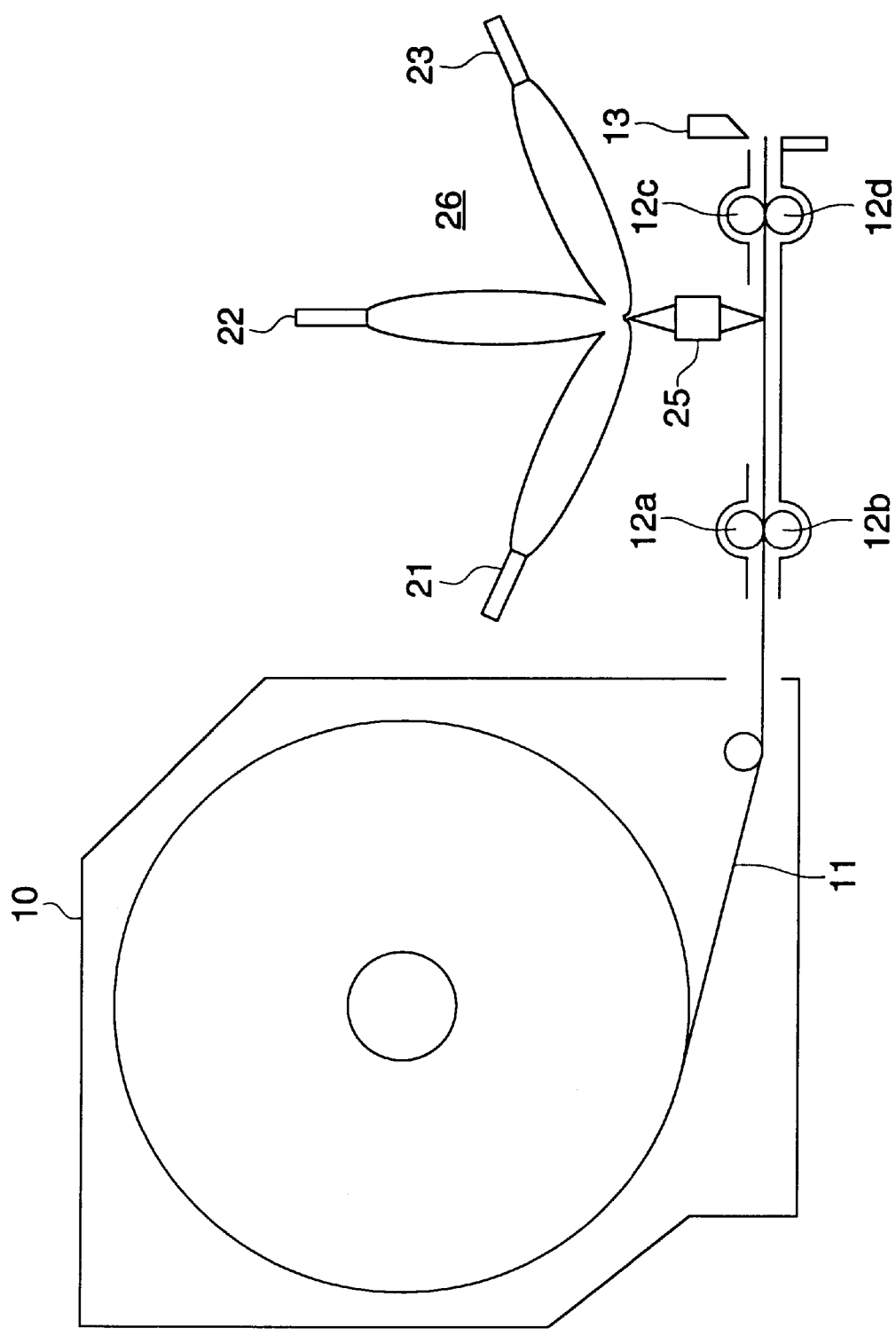
FIG. 5 is a side view showing the overall structure of an image exposing apparatus in the second embodiment of the invention.

Incidentally, in the first embodiment stated above, light fluxes emitted from plural arrayed light sources have been mixed by integrating disk cylinder 24 composed of a large number of integrating disks 240. In opposition to the foregoing, it is also possible to use integrating elliptic cylinder 26 composed of collected elliptic plates having a shape wherein an ellipsoid for each arrayed light source is superposed on others at an emergent outlet as shown in FIG. 5. The integrating elliptic cylinder 26 in this case can also be structured of the same material as for the integrating disk cylinder 24.

In the image exposing apparatus of the embodiment shown in FIG. 5, light fluxes can be easily mixed, because the light fluxes are mixed by the integrating elliptic cylinder 26 that is composed of plural elliptic plates. Namely, in spite of a light flux which is highly diffusible unlike a laser beam, it is possible to make the light flux from each arrayed light source to coincide with others on print material 11.

Therefore, a light flux from an arrayed light source for each color to be recorded is put together with others, and exposure is carried out as one line. Accordingly, it is possible to materialize an image exposing apparatus wherein the structure of a driving circuit and timing control are made to be easy and no doubling is caused, even when the conveyance speed is fluctuated.

(Third embodiment)

In the first embodiment and the second embodiment stated above, integrating disk cylinder 24 composed of a large number of integrating disks 240 or integrating elliptical aggregate cylinder 26 composed of a large number of elliptical aggregated plates are used to mix light fluxes emitted from plural arrayed light sources.

Figure 6:
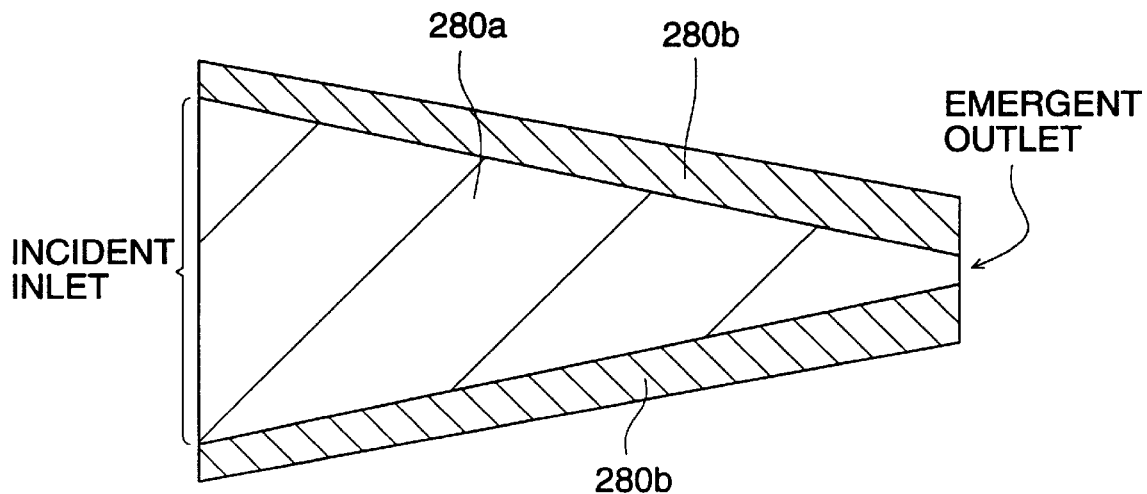
FIGS. 6($a$) and 6($b$) are structure diagrams showing the structure of the image exposing apparatus in the third embodiment of the invention.
Figure 6:
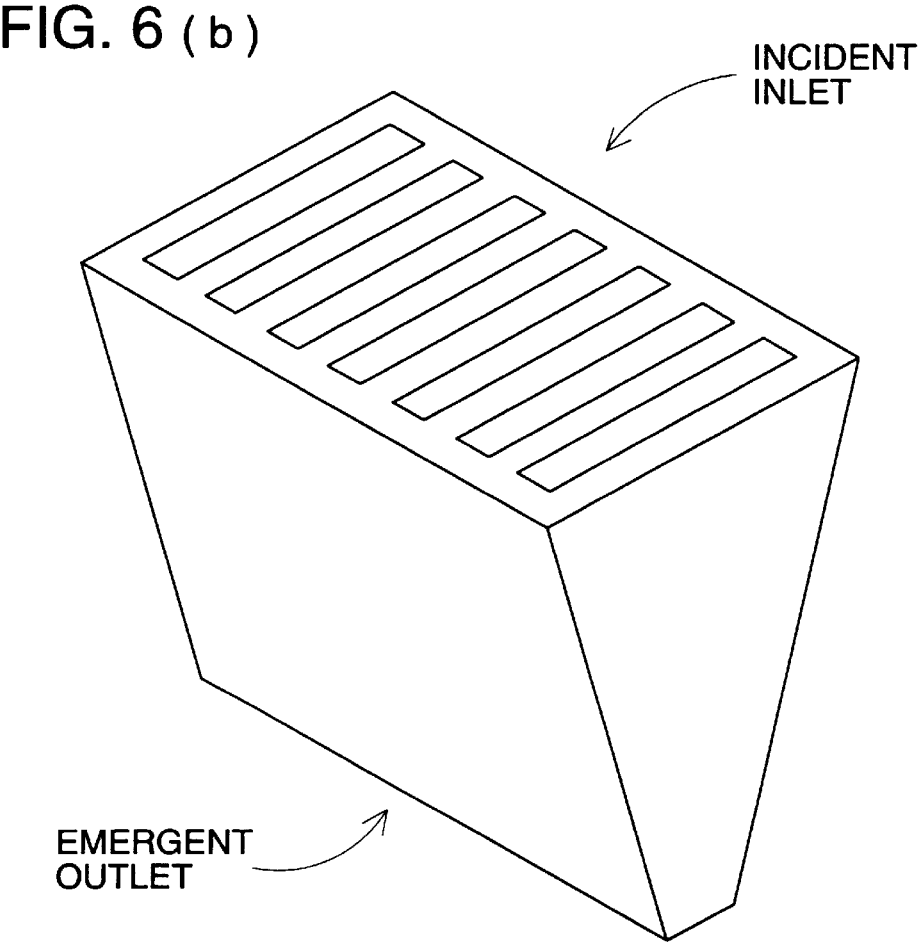

On the contrary, it is also possible, as shown in FIGS. 6(a) and 6(b), to use optical plate aggregate cylinder 28 which is formed by laminating, in the direction of a light flux, optical plates 280 (see FIG. 6(a)) each being equipped with core 280a and clad 280b and having a broader incident inlet and a narrower emergent outlet. It is possible to arrange plural light emitting element rows on the broader incident inlet.

In this case, light entering through the broader incident inlets are transmitted and mixed while they are subjected to total reflection on a boundary between core 280a and clad 280b, and then emerge from the emergent outlet through the same path, thus there is formed an emergent light in a line wherein plural colors are mixed.

Accordingly, light fluxes can easily be mixed. Namely, the light fluxes emitted from arrayed light sources can be focused on print material 11, although each of the light fluxes is a highly diffusive light flux which is different from a laser beam.

Therefore, light fluxes emitted from arrayed light sources each being for each color to be recorded are bound into one, and exposure as one line is conducted. Thus, it is possible to materialize an image exposing apparatus wherein the structure of a driving circuit and timing control are made to be easy, and no doubling is caused even when the conveyance speed is fluctuated.

Therefore, light fluxes emitted from arrayed light sources each being for each color to be recorded are bound into one, and exposure as one line is conducted. Thus, it is possible to materialize an image exposing apparatus wherein a mechanism to maintain the conveyance plane is simple, and the structure of a driving circuit and timing control are made to be easy, and no doubling is caused even when the conveyance speed is fluctuated or the movement in the direction perpendicular to the conveyance direction in the conveyance plane is caused.

Further, in this invention, it is possible to mix light fluxes which hardly have loss, with regard to light fluxes having the angular aperture which is not more than that causing total reflection, because propagation of light is carried out by total reflection.

Figure 7:
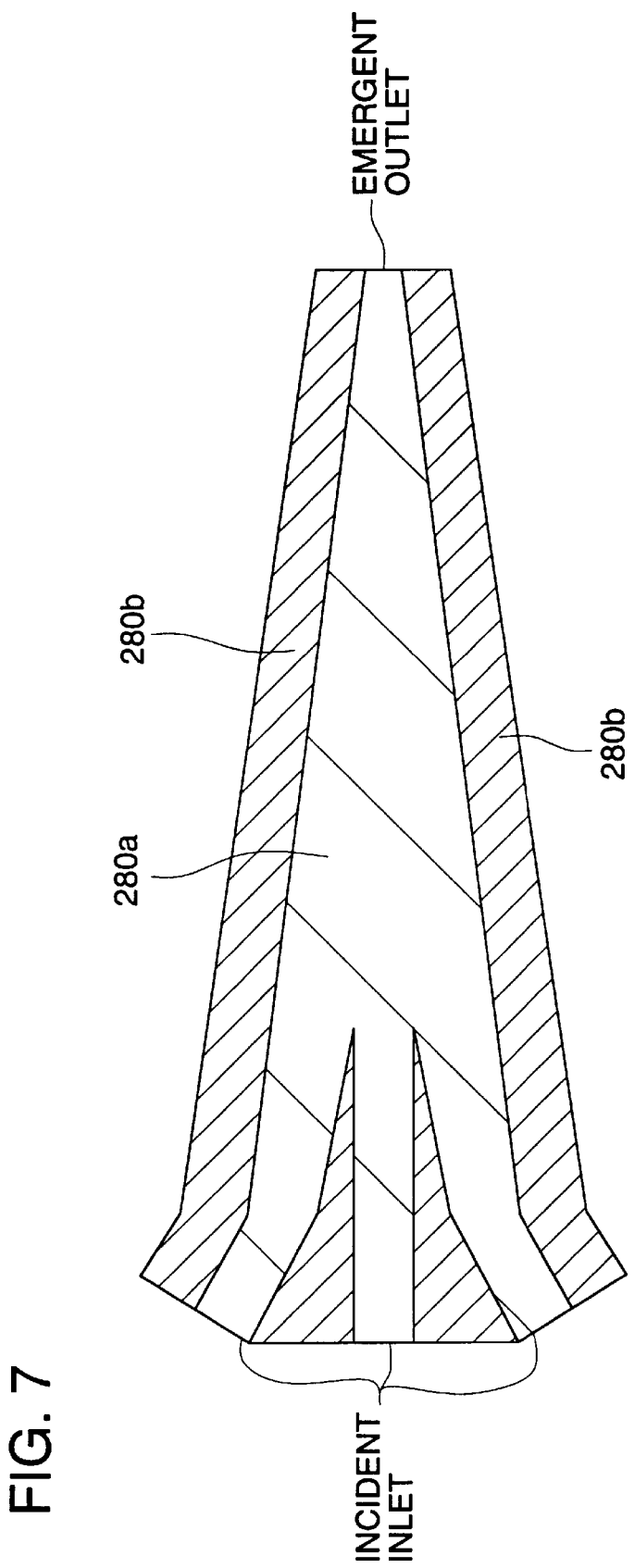
FIG. 7 is a structure diagram showing the structure of the image exposing apparatus in the third embodiment of the invention.

Incidentally, it is possible to provide plural incident inlets in place of the aforesaid broader incident inlets. In that case, as shown in FIG. 7, it is possible to structure so that incident inlets are branched in the optical plate which constitutes a light mixing means.

In this case, there is a merit that the restriction for arrangement of arrayed light sources is eliminated. In addition, it is possible to make light enter through the side of the plate, by using a prism or the like.

When using such optical plate aggregate cylinder 28, it can also play the role of a reducing optical system.

FIGS. 8(a) through 8(d) are diagrams which illustratively show only core 280a of the optical plate aggregate cylinder 28 having the function of the reducing optical system. FIG. 8(a) shows the core 280a viewed from the incident inlet and FIG. 8(b) is a side view wherein an incident inlet and an emergent outlet are arranged vertically. FIG. 8(c) is an illustrative diagram showing an arrangement of the core 280a on a three-dimensional basis. In the case of this diagram, it is possible to reduce a light flux in 114 mm to its half in 57 mm as shown in FIG. 8(d).

Incidentally, it is preferable that a part or an entire surface of the side of a plate is a mirror surface in the aforesaid case. In particular, it is preferable in terms of transmitting of light that a boundary surface of the portion which is not in parallel with the forwarding direction of a light flux is made to be a mirror surface. By making the surface to be a mirror surface, a plate can be made to be in a desired shape.

What was realized on the plate can also be realized on an aggregate of optical fibers where plural lines each being similar to one in FIG. 7 in terms of a shape are combined into one line. In that case, a boundary plane inside the optical fibers can be made to be in parallel with the light forwarding direction easily, and light loss is small, resulting in an image exposing apparatus wherein a light mixing means has been made small.

(Fourth embodiment)

Incidentally, in the embodiment stated above, light fluxes emitted from plural arrayed light sources have been mixed by integrating disk cylinder 24 or integrating elliptic cylinder 26. In opposition to the foregoing, it is also possible to use dichroic prism 27 as shown in FIG. 9.

Figure 9:
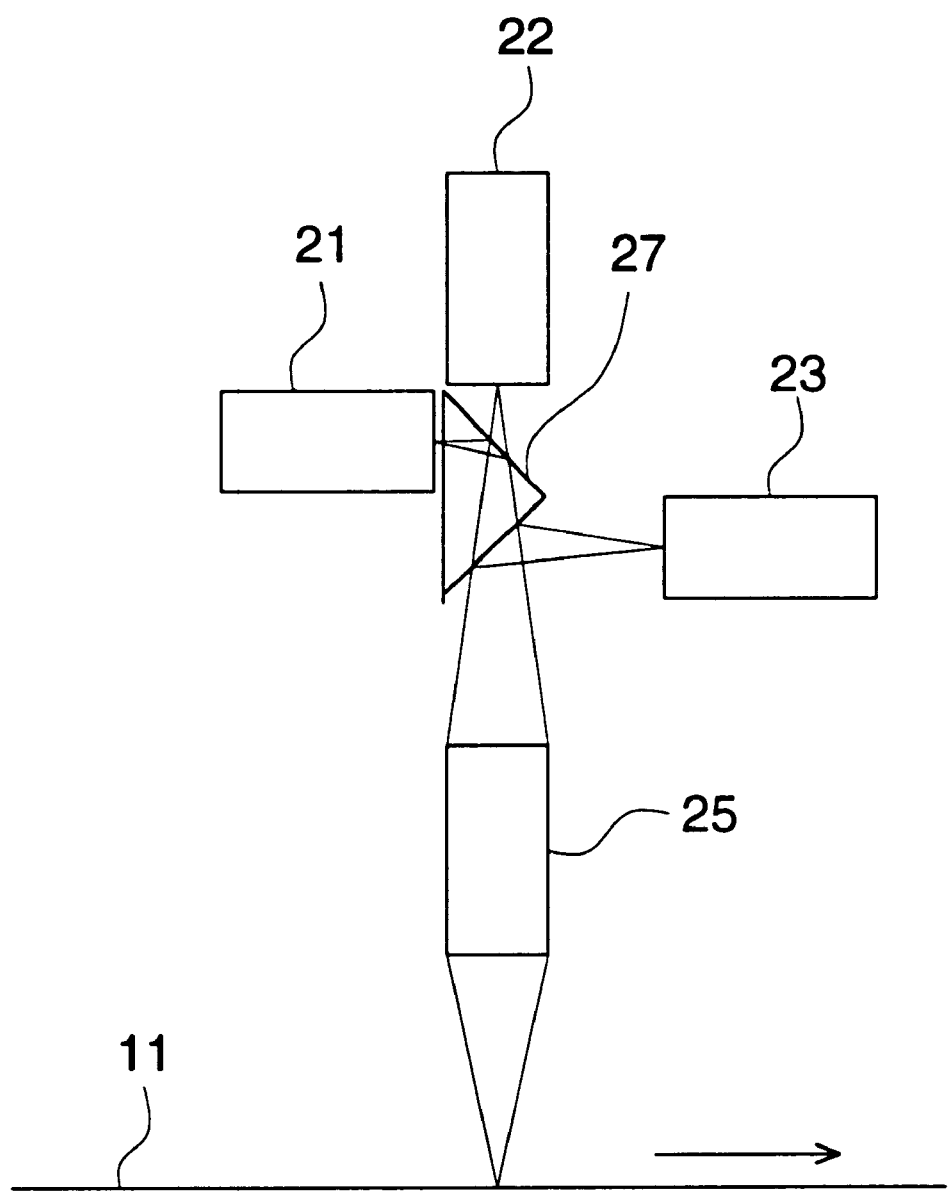
FIG. 9 is a side view showing the overall structure of an image exposing apparatus in the fourth embodiment of the invention.

In the image exposing apparatus of the embodiment shown in FIG. 9, light fluxes can be mixed easily, because the light fluxes are mixed by the dichroic prism 27. Namely, in spite of a light flux which is highly diffusible unlike a light beam that travels far away without diffusing like a laser beam, it is possible to make a light flux from each arrayed light source to coincide with others on print material 11.

Therefore, a light flux from an arrayed light source for each color to be recorded is merged together with others, and exposure is carried out as one line. Accordingly, it is possible to materialize an image exposing apparatus wherein the structure of a driving circuit and timing control are made to be easy and no doubling is caused even when the conveyance speed is fluctuated.

Incidentally, since the dichroic prism 27 is a wavelength selective optical member which selectively transmits or reflects depending on the wavelength of light, it is not necessary to use an arrayed light source which emits light having the specific wavelength. Namely, it is possible to use a light source for white color for the first arrayed light source 21 through the third arrayed light source 23. Due to this, it is possible to simplify the structure of the apparatus and to structure the apparatus to be inexpensive.

Incidentally, an occasion wherein a light flux emitted from array light source 21 and a light flux emitted from array light source 22 which are composed on the first light selection plane are subjected to total reflection on the second light selection plane, because a light flux emitted from array light source 22 is refracted on the first light selection plane, can actually happen due to a difference of refractive index between a prism and a medium which covers the prism. In that case, this problem can be solved by inserting a prism between array light source 22 and the first refraction plane, between array light source 23 and the second refraction plane, and between the second refraction plane and SELFOC lens array.

It is further possible to provide a SELFOC lens array and an optical fiber aggregate between a group of the first arrayed light source 21 through the third arrayed light source 23 and the dichroic mirror, in the present embodiment. Due to this, the restriction for the sizes and positions of the light mixing member and the arrayed light source can be reduced.

When one of different wavelengths from each arrayed light source corresponds to green in the embodiment wherein dichroic prism 27 is used, it is preferable to structure so that a light flux for the green is reflected at least once by the dichroic prism which is a wavelength selective optical member.

Namely, when mixing light fluxes each having a different wavelength while making them to be reflected or transmitted, green which has greatest influence on visual sense because of high spectral luminous efficiency is caused to be emitted from array light source 23 so that the number of times of transmission or reflection may be minimum to minimize deterioration. Therefore, excellent efficiency can be maintained as an image exposing apparatus. Incidentally, most preferable condition is in the state wherein the number of times of reflection for green is one.

In the embodiment wherein this dichroic prism 27 is used, when one of light fluxes with different wavelengths emitted from various array light sources is one corresponding to blue, it is preferable that the blue light flux is structured by a dichroic prism representing a wavelength selecting optical member so that the number of times of transmission or reflection is maximum. Namely, when mixing light fluxes each having a different wavelength while making them to be reflected or transmitted, blue which has small influence on visual sense because of low spectral luminous efficiency is caused to be emitted from the first array light source 21 and second array light source 22 to be reflected on or transmitted through dichroic prism 27. Therefore, excellent efficiency can be maintained as an image exposing apparatus.

(Fifth embodiment)

Incidentally, though the dichroic prism 27 is used in the foregoing, it is also possible to realize the same function as in the dichroic prism 27 by dichroic mirror 29.

Figure 10:
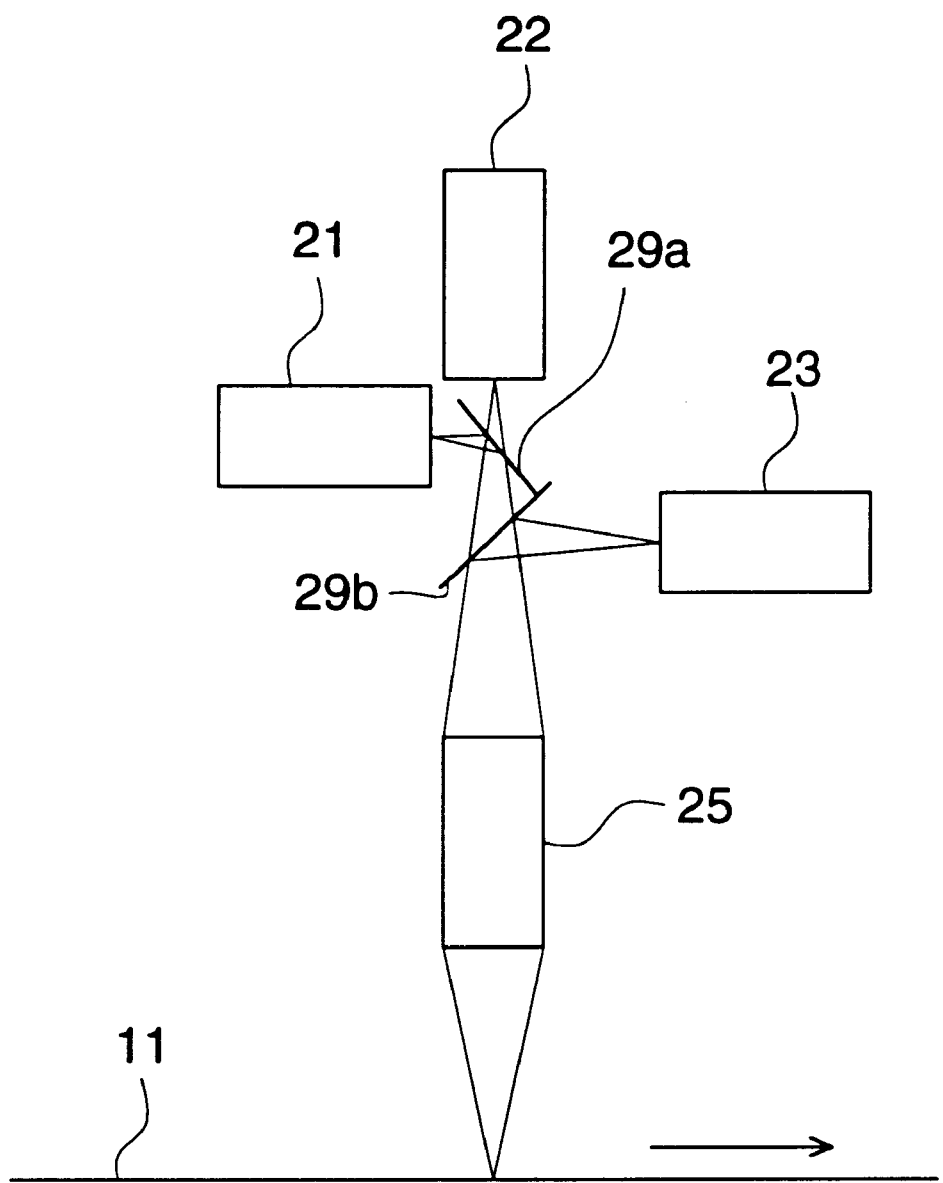
FIG. 10 is a structure diagram showing the structure of the image exposing apparatus in the fifth embodiment of the invention.

Since dichroic mirrors 29a and 29b are used to mix light fluxes in the image exposing apparatus in the embodiment shown in FIG. 10, light fluxes can be mixed easily.

In this case, an arrangement is made on dichroic mirror 29a so that a light flux with wavelength from the first arrayed light source 21 may be reflected while a light flux with wavelength from the second arrayed light source 22 may be transmitted. For dichroic mirror 29b, on the other hand, an arrangement is made so that a light flux of wavelength from the first and second arrayed light fluxes 21 and 22 may be transmitted, and a light flux of wavelength from the third arrayed light flux 23 may be reflected.

Namely, the light fluxes emitted from arrayed light sources can be focused on print material 11, although each of the light fluxes is a highly diffusive light flux which is different from a light beam that can go far without being diffused like a laser beam.

Therefore, light fluxes emitted from arrayed light sources each being for each color to be recorded are bound into one, and exposure as one line is conducted. Thus, it is possible to materialize an image exposing apparatus wherein the structure of a driving circuit and timing control are made to be easy, and no doubling is caused even when the conveyance speed is fluctuated.

Incidentally, since the dichroic mirror 29 is a wavelength selective optical member which selectively transmits or reflects depending on the wavelength of light, it is not necessary to use an arrayed light source which emits light having the specific wavelength. Namely, it is possible to use a light source for white color for the first arrayed light source 21 through the third arrayed light source 23. Due to this, it is possible to simplify the structure of the apparatus and to structure the apparatus to be inexpensive.

Incidentally, it is further possible to provide a SELFOC lens array and an optical fiber aggregate between a group of the first arrayed light source 21 through the third arrayed light source 23 and the dichroic mirror, in the present embodiment. Due to this, the restriction for the sizes and positions of the light mixing member and the arrayed light source can be reduced.

(Sixth embodiment)

Incidentally, though the dichroic prism 27 is used in the foregoing, it is also possible to realize the same function as in the dichroic prism 27 by an ordinary prism.

Figure 11:
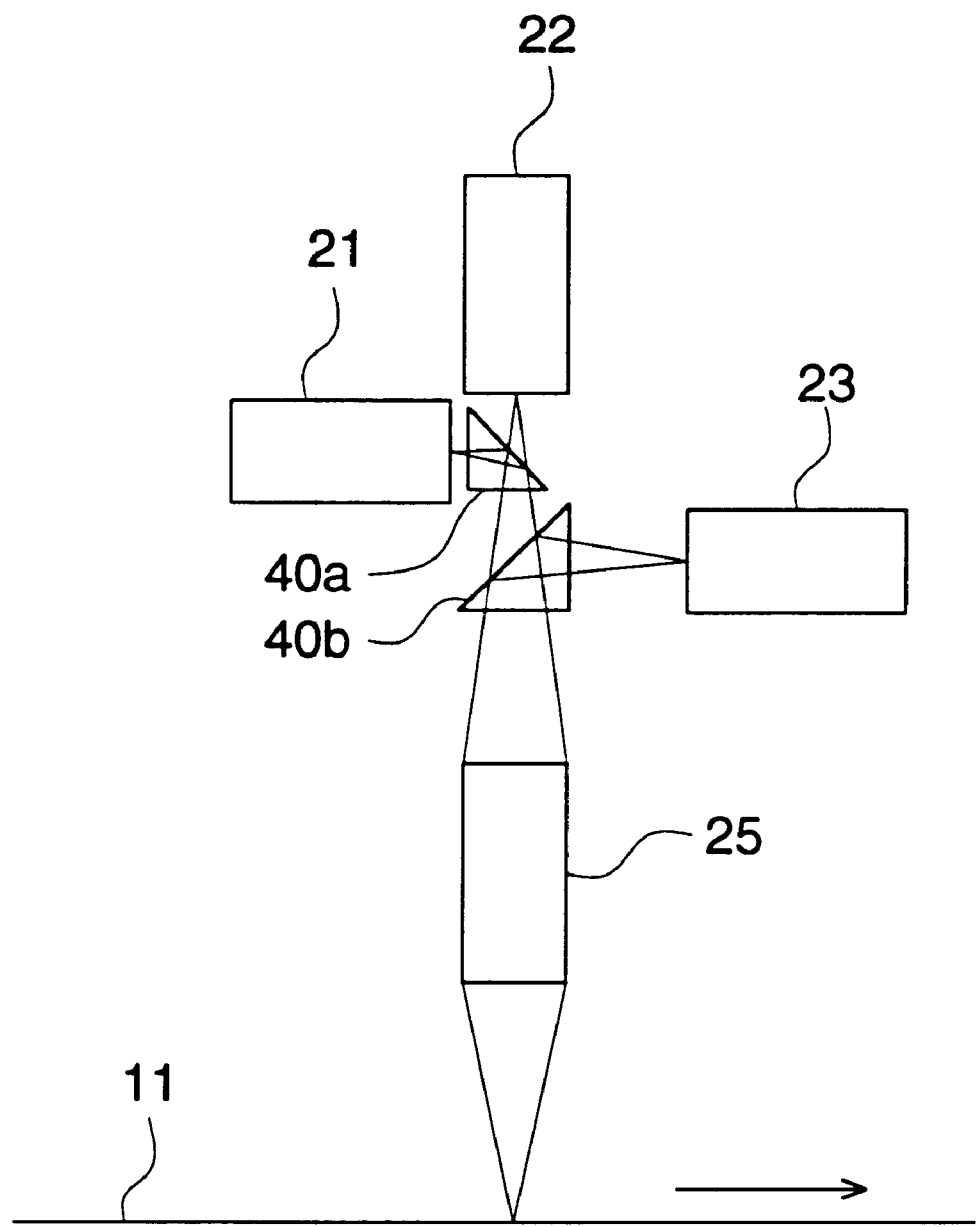
FIG. 11 is a structure diagram showing the structure of the image exposing apparatus in the sixth embodiment of the invention.

Since light fluxes from the first arrayed light source 21 and the second arrayed light source 22 are mixed by prism 40a and further light fluxes including one from the third arrayed light source 23 are mixed by prism 40b, in the image exposing apparatus in the embodiment shown in FIG. 11, light fluxes can be mixed easily. Namely, the light fluxes emitted from arrayed light sources can be focused on print material 11, although each of the light fluxes is a highly diffusive light flux which is different from a light beam that can go far without being diffused like a laser beam.

Therefore, light fluxes emitted from arrayed light sources each being for each color to be recorded are bound into one, and exposure as one line is conducted. Thus, it is possible to materialize an image exposing apparatus wherein the structure of a driving circuit and timing control are made to be easy, and no doubling is caused even when the conveyance speed is fluctuated.

(Seventh embodiment)

In the first embodiment through the sixth embodiment stated above, a single arrayed light source is used for each color to be recorded. However, it sometimes happens that sufficient amount of exposure can not be obtained by a single arrayed light source.

Figure 12:
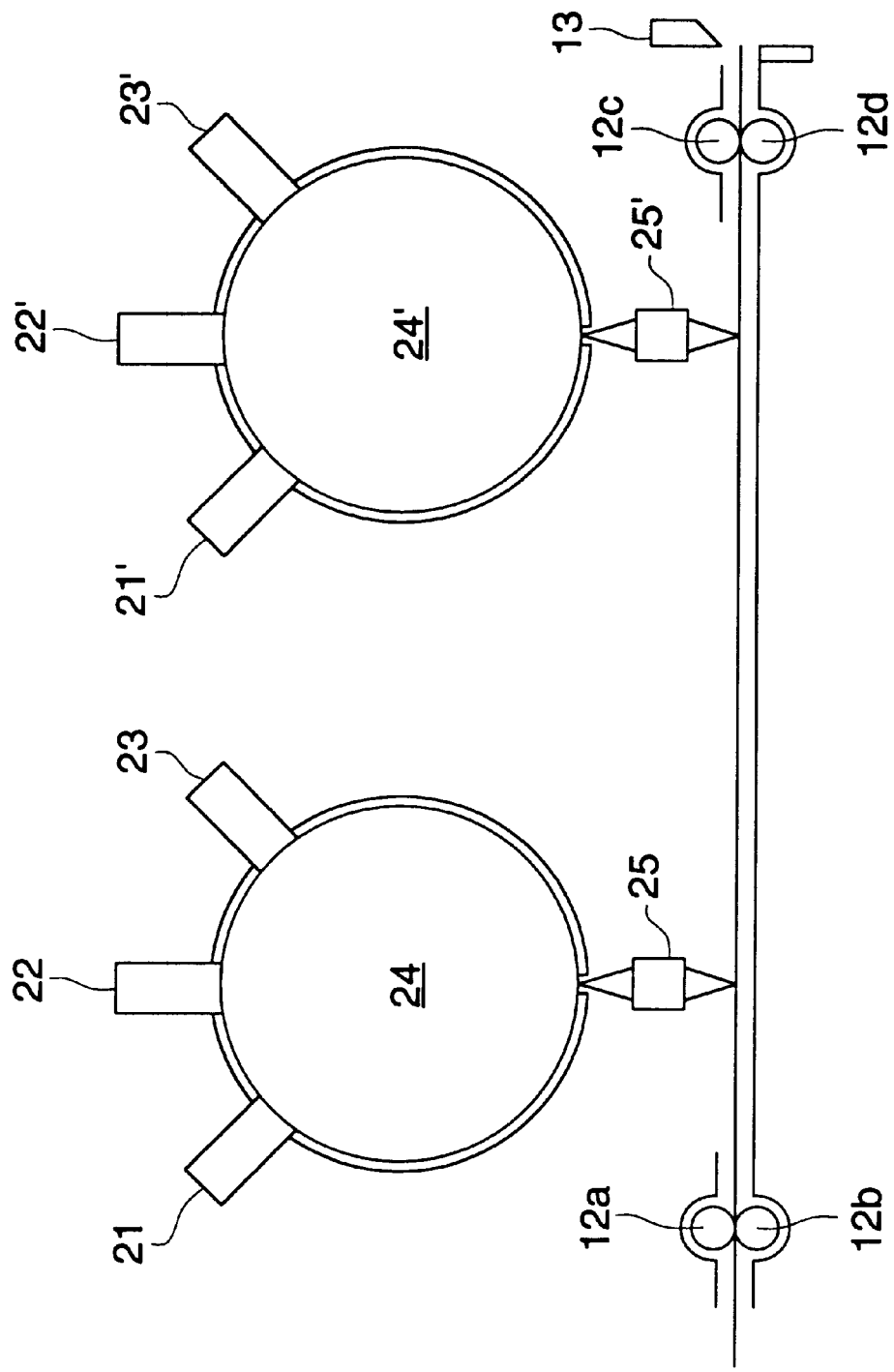
FIG. 12 is a structure diagram showing the structure of the image exposing apparatus in the seventh embodiment of the invention.

It is therefore necessary to make an arrangement to provide integrating disk cylinder 24 which mixes light fluxes from the first arrayed light source 21 through the third arrayed light source 23 and to provide, in the same manner as in the foregoing, integrating disk cylinder 24' which mixes light fluxes from the first arrayed light source 21' through the third arrayed light source 23', as shown in FIG. 12. Namely, two sets of light fluxes mixed for colors to be recorded are produced. Due to this, an amount of light can be doubled. Further, for each color to be recorded, light mixing is conducted to be bound into one, and exposure as two lines in total is conducted. Thus, it is possible to materialize an image exposing apparatus wherein the structure of a driving circuit and timing control are made to be easy, and no doubling is caused even when the conveyance speed is fluctuated.

Incidentally, it is also possible to replace the integrating disk cylinders 24 and 24' in FIG. 12 with other mixing means such as a prism and a mirror.

(Eighth embodiment)

In the first embodiment through the sixth embodiment stated above, a single arrayed light source is used for each color to be recorded. In addition, light mixing is conducted for light each being of a different wavelength. However, it sometimes happens that sufficient amount of exposure can not be obtained by a single arrayed light source.

Figure 13:
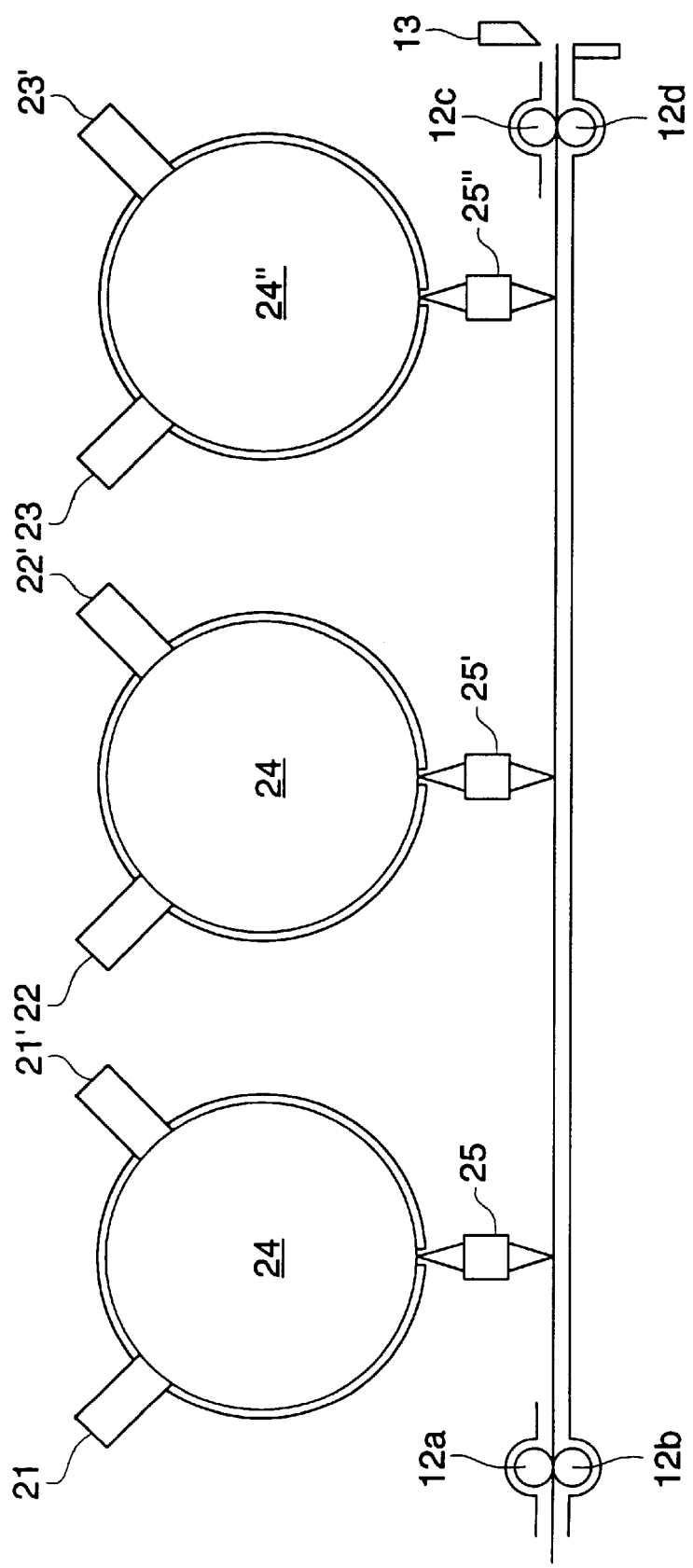
FIG. 13 is a structure diagram showing the structure of the image exposing apparatus in the eighth embodiment of the invention.

It is therefore necessary to make an arrangement to provide integrating disk cylinder 24 which mixes light fluxes from the first arrayed light source 21 and the first arrayed light source 21' both for the first color to be recorded, integrating disk cylinder 24' which mixes light fluxes from the second arrayed light source 22 and the second arrayed light source 22' both for the second color to be recorded, and integrating disk cylinder 24" which mixes light fluxes from the third arrayed light source 23 and the third arrayed light source 23' both for the third color to be recorded, as shown in FIG. 13.

Namely, mixing of light from plural light emitting element rows for the same color to be recorded is conducted, and this is prepared for each of necessary colors. Owing to this, it is possible to double an amount of light. Incidentally, the amount of light can further be increased if mixing of more light is conducted.

In this case, for each color to be recorded, plural mixture for light are conducted to be bound into one, and exposures for the colors to be recorded are conducted. Thus, it is possible to materialize an image exposing apparatus wherein the structure of a driving circuit and timing control are made to be easy, and doubling is hardly caused even when the conveyance speed is fluctuated.

Incidentally, it is also possible to replace the integrating disk cylinders 24 and 24' in FIG. 12 with other mixing means such as a prism and a mirror.

In this case, it is assumed that writing from each of light emitting element rows for the same color is conducted at the same timing. This prevents occurrence of density difference caused by reciprocity law failure characteristics owned by a light-sensitive material.

(Ninth embodiment)

Figure 14:
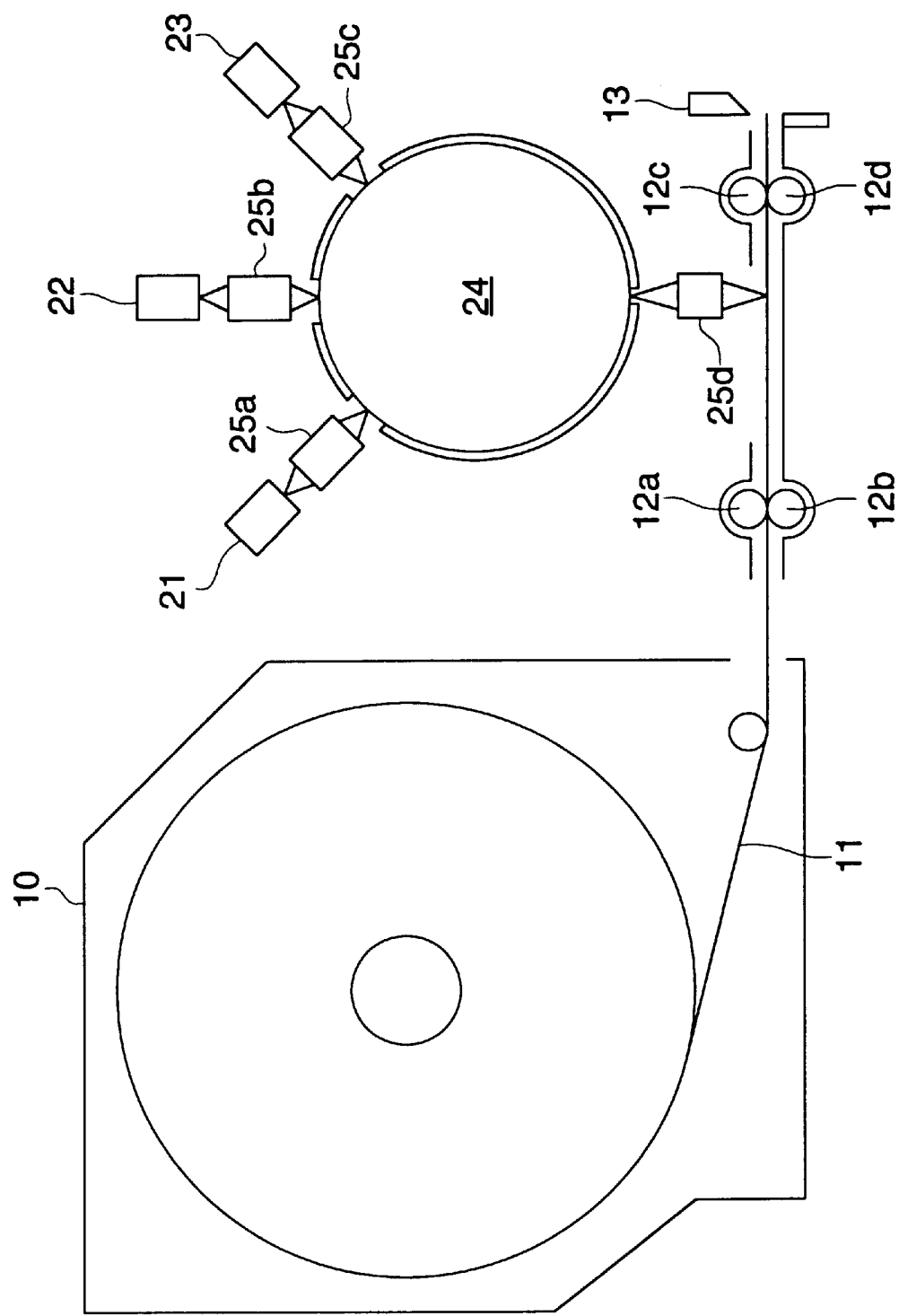
FIG. 14 is a structure diagram showing the structure of the image exposing apparatus in the ninth embodiment of the invention.

The first embodiment through the eighth embodiment described above show an occasion wherein a SELFOC lens array 25 is arranged between an emergent outlet of a light mixing means and a light-sensitive material. On the contrary, it is also possible to arrange a SELFOC lens array on each of the incident inlet and the emergent outlet of the light mixing means as shown in FIG. 14.

At the incident inlet side, a light transfer means can be used as a light transfer means. Since a light transfer means is used in each of light emitting element rows to transfer a light flux in the present embodiment, it is possible to keep the member to hold a light emitting element and a driving circuit away from a light mixing member. It is also possible to ease the restriction of the size of the light mixing means caused by the physical size of an array light source.

In this embodiment, an image is formed on each incident inlet of integrating disk cylinder 24 by the use of the light transmitting means (SELFOC lens array 25a—SELFOC lens array 25c) for each of light emitting rows (the first arrayed light source 21—the third arrayed light source 23). Therefore, the depth of focus of the light transmitting means makes an adjustment of an image forming position for each light emitting element row to be easy. It is also possible to ease the restriction for the size of a light mixing means caused by the physical size of an arrayed light source.

In this embodiment again, an image is formed on a light-sensitive material by the use of SELFOC lens array 25d serving as the image forming means. Therefore, the depth of focus makes an adjustment to be easy. As a result, it is possible to materialize an image exposing apparatus wherein a mechanism to maintain the conveyance plane is simple, and no doubling is caused even when the movement in the direction perpendicular to the conveyance direction in the conveyance plane is caused.

Incidentally, it is preferable that chromatic aberration of a lens on the part of an image forming means is within a depth of focus. In this case, the depth of focus in the present apparatus is, for example, a depth of focus under the condition of MTF 89%.

To be concrete, it is preferable that chromatic aberration of a lens on the part of an image forming means is within 800 $\mu$m at both the longest wavelength and the shortest wavelength. When the chromatic aberration which is within 800 $\mu$m is realized, high image quality can be maintained because image deterioration caused by chromatic aberration can be controlled. Further, when this condition of chromatic aberration is satisfied, a lens with a small F number can be used, and a loss of light can be restrained.

In this embodiment, it is possible to maintain high image quality without being caused by doubling even when a light-sensitive material is vibrated while it is conveyed, because chromatic aberration between the shortest wavelength and the longest wavelength of the mixed light flux emerging from the light mixing means is within a prescribed value in SELFOC lens array 25*d*.

Further, it is preferable that an aperture angle of SELFOC lens array 25*d* representing the image forming means is not smaller than that of SELFOC lens array 25*a* through SELFOC lens array 25*c* representing the light transmitting means.

In this embodiment, it is possible to handle effectively at least a light flux emerging after being mixed and thereby to minimize loss of an amount of light, because an aperture angle of the second image forming means is large.

It is further preferable that a focal length of SELFOC lens array 25*d* representing the second image forming means is not smaller than that of SELFOC lens array 25*a* through SELFOC lens array 25*c* representing the first image forming means.

Due to the great focal length on the part of the second image forming means, this embodiment is highly resistant to fluctuation of a focal length, making an adjustment to be easy and being affected less by vibration of a light-sensitive material.

(Tenth embodiment)

Figure 15:
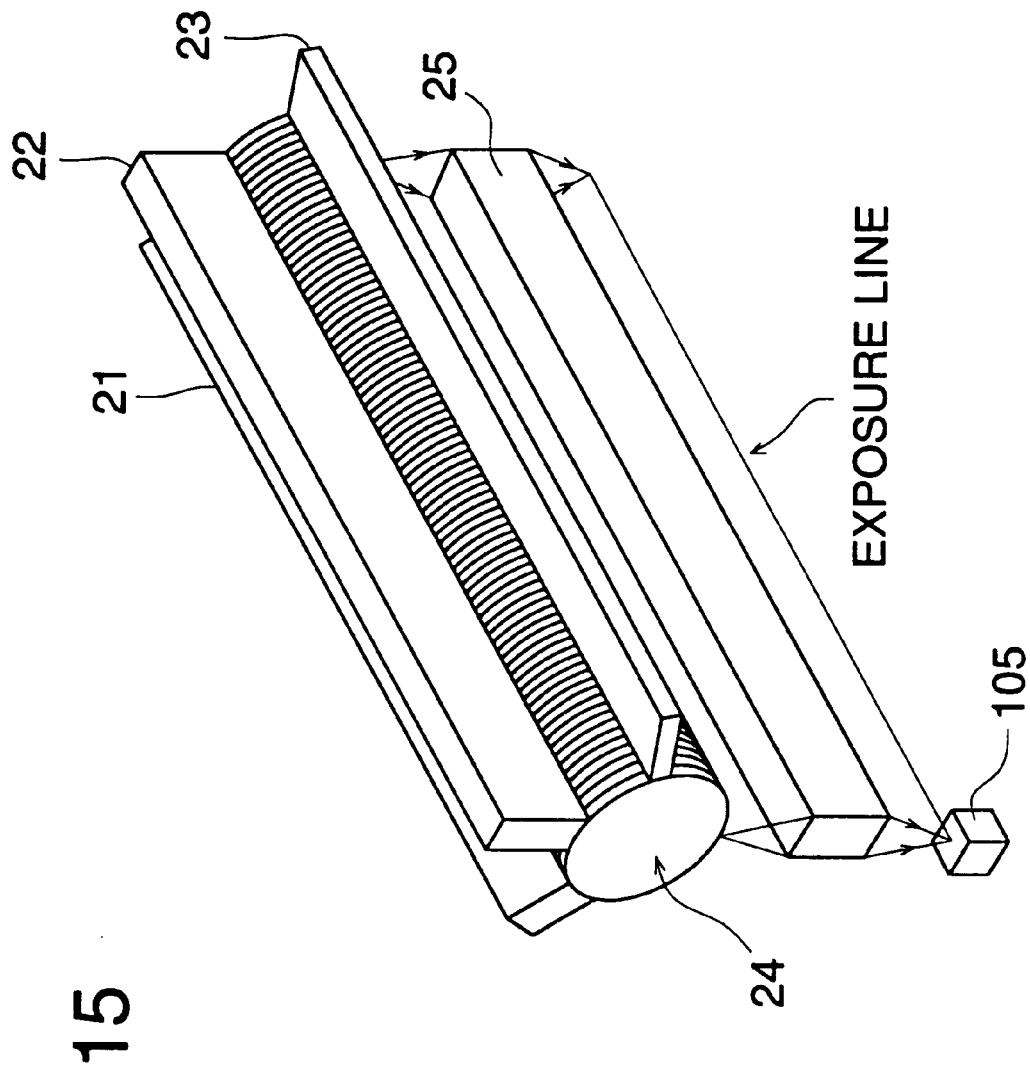
FIG. 15 is a structure diagram showing the structure of the image exposing apparatus in the tenth embodiment of the invention.

FIG. 15 is a perspective view showing an arrangement for conducting correction of an exposure amount on an image exposing apparatus. Those which have already been explained are given the same numbers. In this case, an example of an image exposing apparatus using integrated disk column 24 is shown, but other light mixing means can also be used. The numeral 105 represents a light-receiving element head serving as a light-receiving means for correction of an exposure amount. This light-receiving element head is structured to be capable of being moved along an exposure line by a driving section which will be explained later. It is preferable that this light-receiving element head 105 is structured with means which can detect multi-color such as color CCD.

Figure 16:
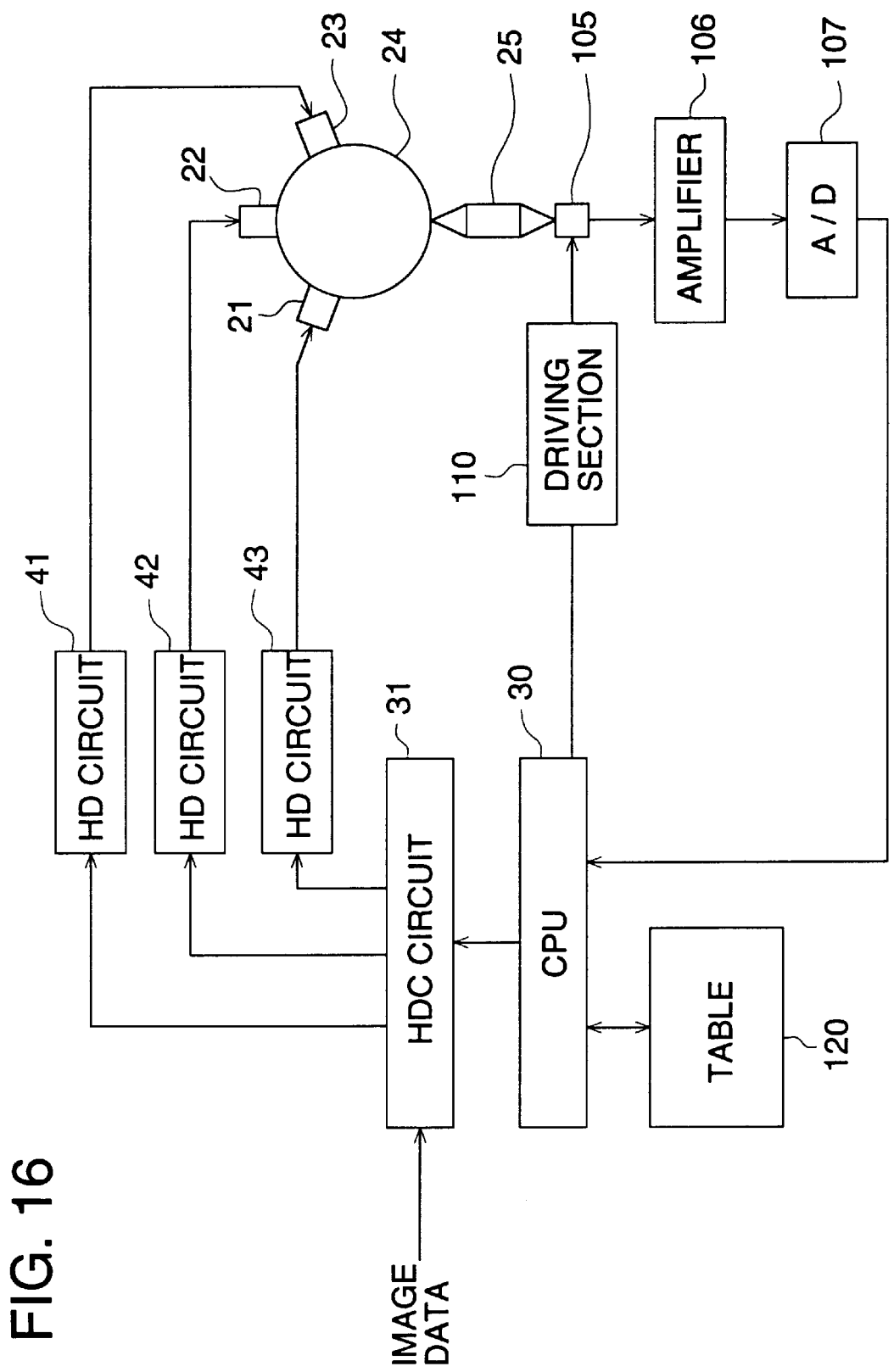
FIG. 16 is a structure diagram showing the structure of an image exposing apparatus in the tenth embodiment of the invention.

FIG. 16 is a block diagram showing the structure of an image exposing apparatus which can conduct correction of an exposure amount. Those which are the same as those in FIG. 4 explained already are given the same numbers.

In FIG. 16, light-receiving results of light-receiving element head 105 driven by driving section 110 are amplified by amplifier 106 and are converted into digital data by A/D converter 107. The digital data are data showing a light emitting level of each pixel of a light emitting element row. Correction values prepared by CPU 30 based on the digital data are stored in table 120.

Now, correction of an exposure amount will be explained as follows, referring to the flow chart in FIG. 17.

Figure 17:
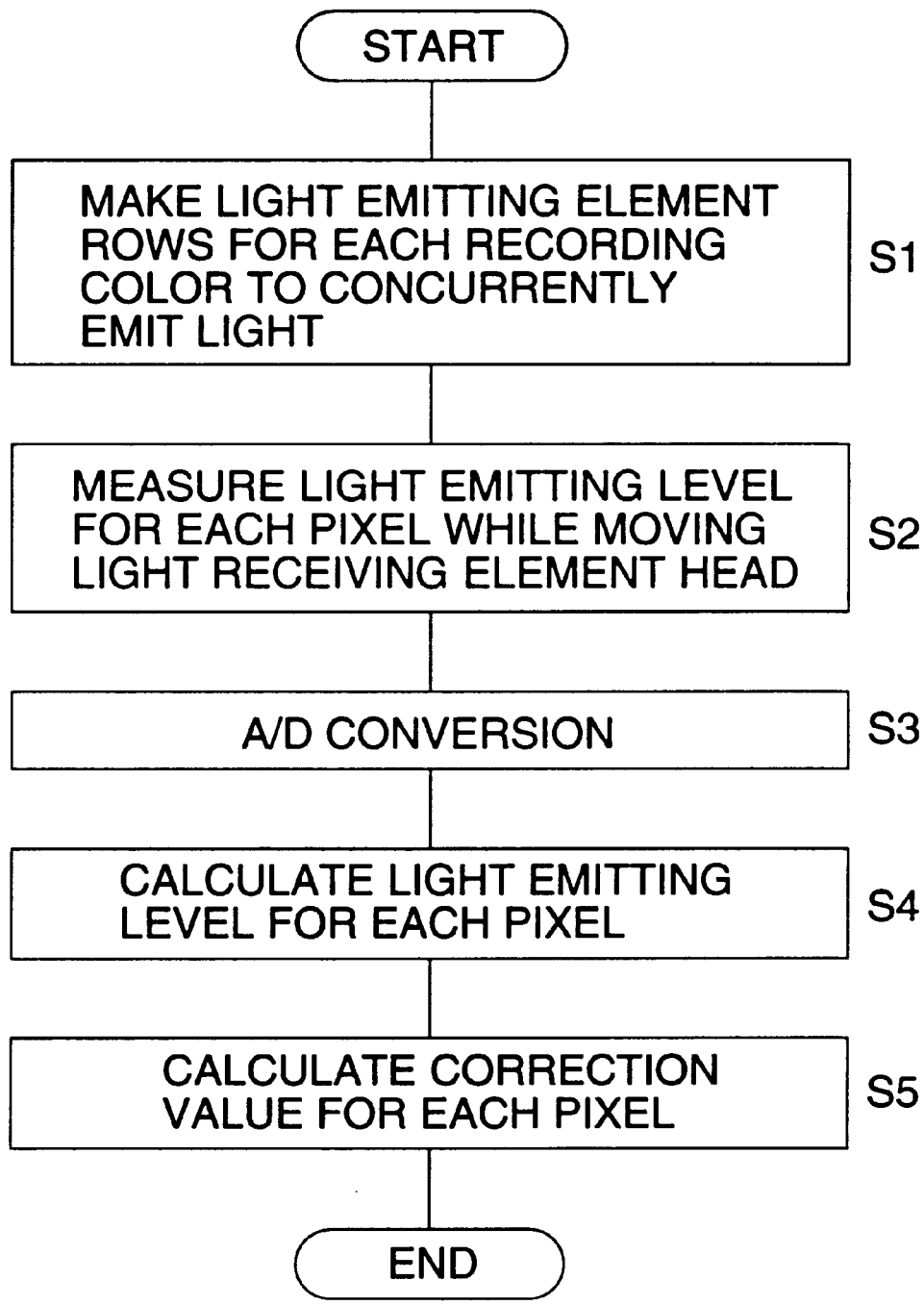
FIG. 17 is a flow chart showing operations of an image exposing apparatus in the tenth embodiment of the invention.

In this arrangement, CPU 30 makes all pixels of light emitting element rows 21–23 for each recording color to be lit collectively at a prescribed light emitting level (S1 in FIG. 17).

Light emitting level in this case is subjected to light-receiving by light-receiving element head 105 whose light-receiving surface is arranged on the focal position of SELFOC lens array 25. In this case, the light-receiving element head 105 is moved along an exposure line by driving section 110 (S2 in FIG. 17).

Then, the results of light-receiving by the light-receiving element head 105 are amplified by amplifier 106, then, converted into digital data by A/D converter 107, and supplied to CPU 30. In CPU 30, the digital data are received, and a light emitting level of each pixel of each light emitting element row is calculated (S4 in FIG. 17). Then, CPU 30 compares the light emitting level thus detected with the level instructed for light emitting to calculate a value of correction for each pixel (S5 in FIG. 17). After that, the value of correction is stored in table 120.

Owing to this correction of an amount of exposure, a value of correction for each pixel of a light emitting element row for each recording color is obtained, and when the actual image data are used for conducting exposure, CPU 30 gives instruction for correction to HDC circuit 31.

In this correction of an amount of exposure, a single scanning of light-receiving element head 105 can make processing to be completed, because a light flux for each recording color has been mixed by a light mixing means and a light emitting level for each recording color has been detected by a light-receiving element row simultaneously.

It is therefore possible to simplify operations and processing more than those wherein three heads are provided for three recording colors, or scanning with one head is conducted three times for three recording colors. Further, only adjustment to conduct scanning by aligning to one exposure line is enough, and it is not necessary to conduct operations to make three light-receiving element heads to be in parallel with each other to match parallelism of light fluxes of three recording colors.

(Eleventh embodiment)

Figure 18:
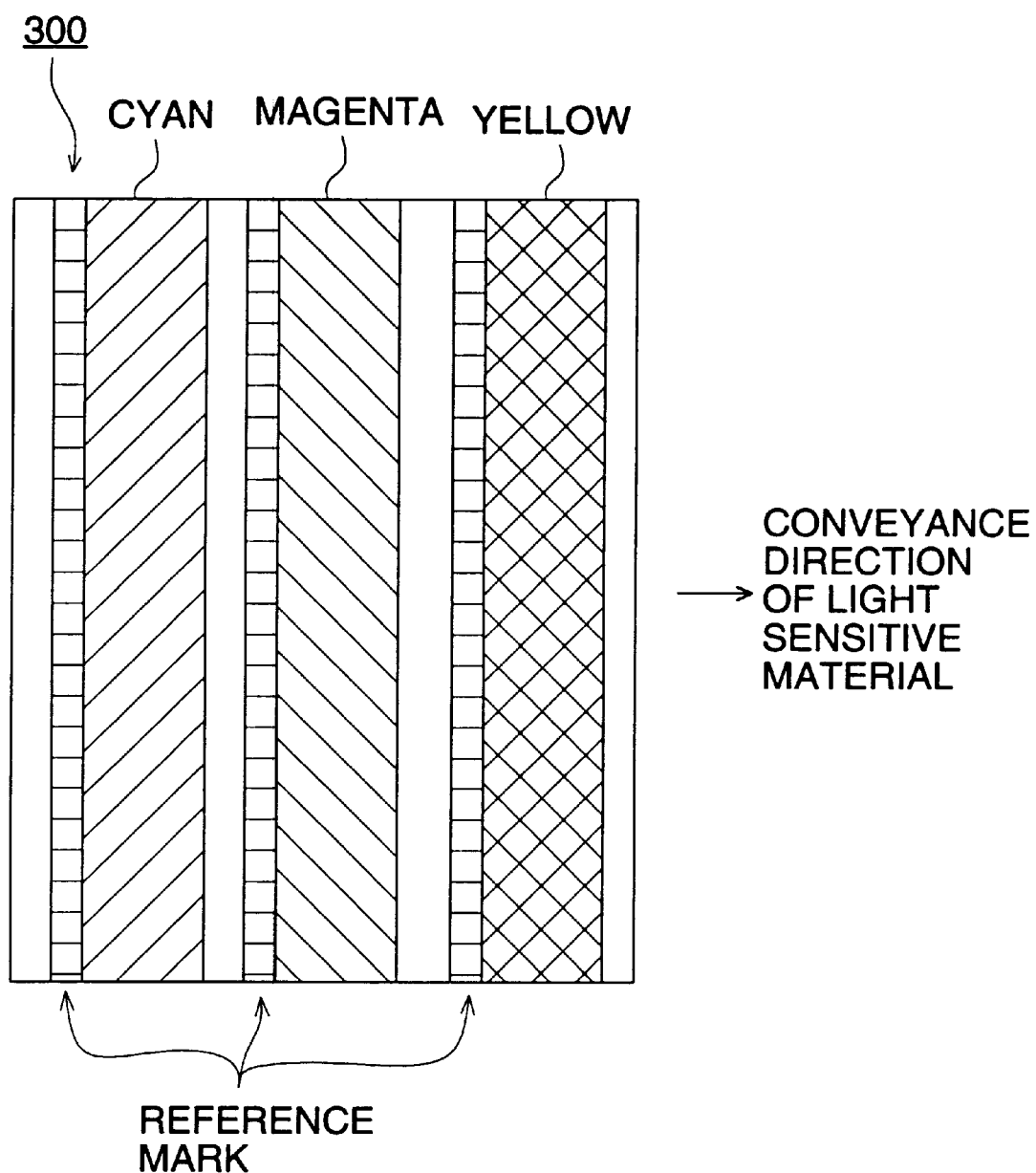
FIG. 18 is an illustration showing an example of a print for correction used in the eleventh embodiment of the invention.

FIG. 18 is an illustration showing an example of a plate for correction which is used when correction of an amount of exposure is conducted by the use of a print and a flat bed scanner. Now, the correction of an amount of exposure will be explained as follows, referring to the flow chart in FIG. 20.

Figure 20:
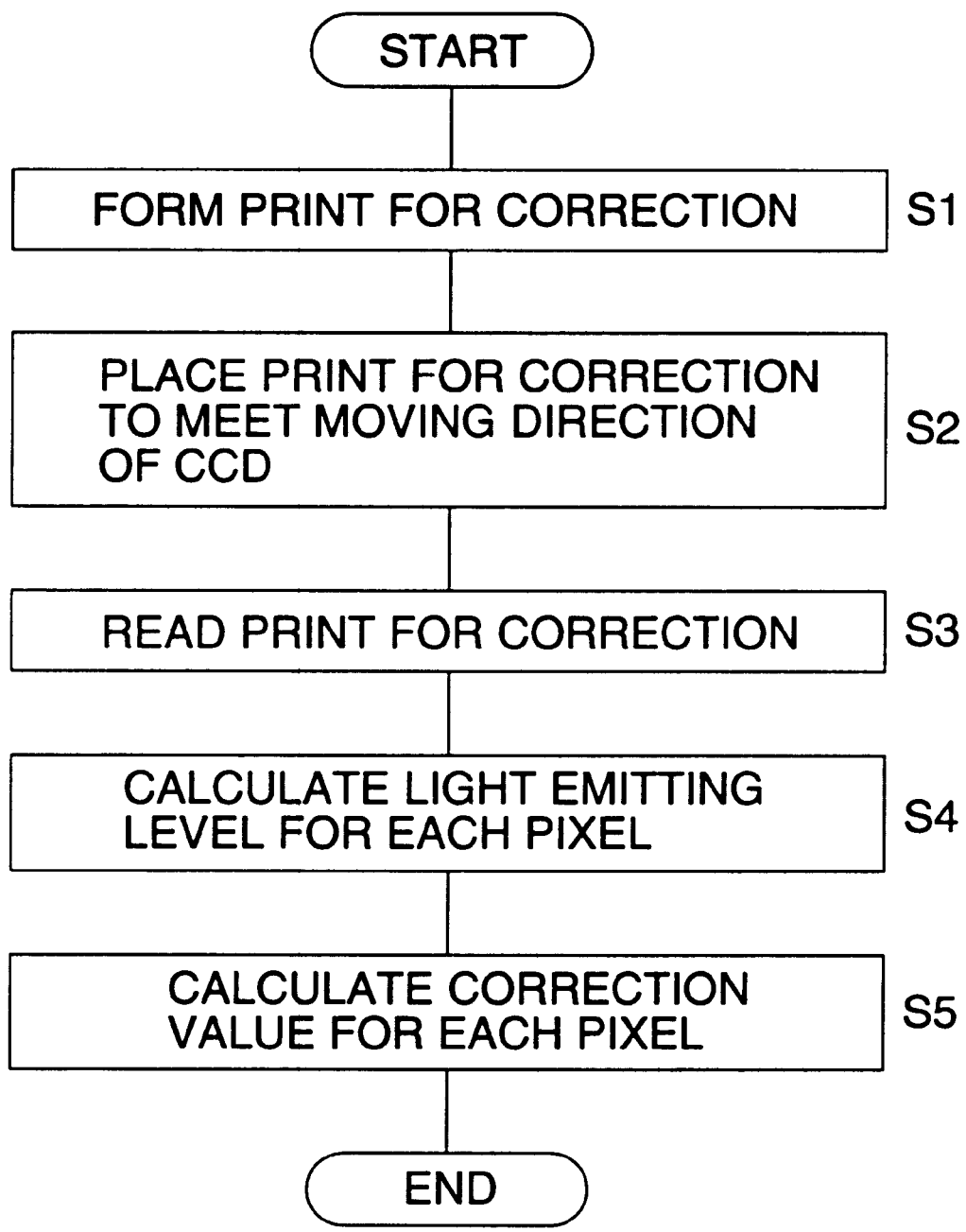
FIG. 20 is a flow chart showing operations in the eleventh embodiment of the invention.

First, a lattice-patterned reference marker shown in FIG. 18 and solid image areas each having a prescribed width and density for cyan, magenta and yellow which are adjacent to the reference marker are formed by an image exposing apparatus of each embodiment stated above (S1 in FIG. 20). Incidentally, in this case, the image is formed so that the longitudinal direction of each of the reference marker and the solid image area may agree with the direction perpendicular to the conveyance direction for a light-sensitive material.

Figure 19:
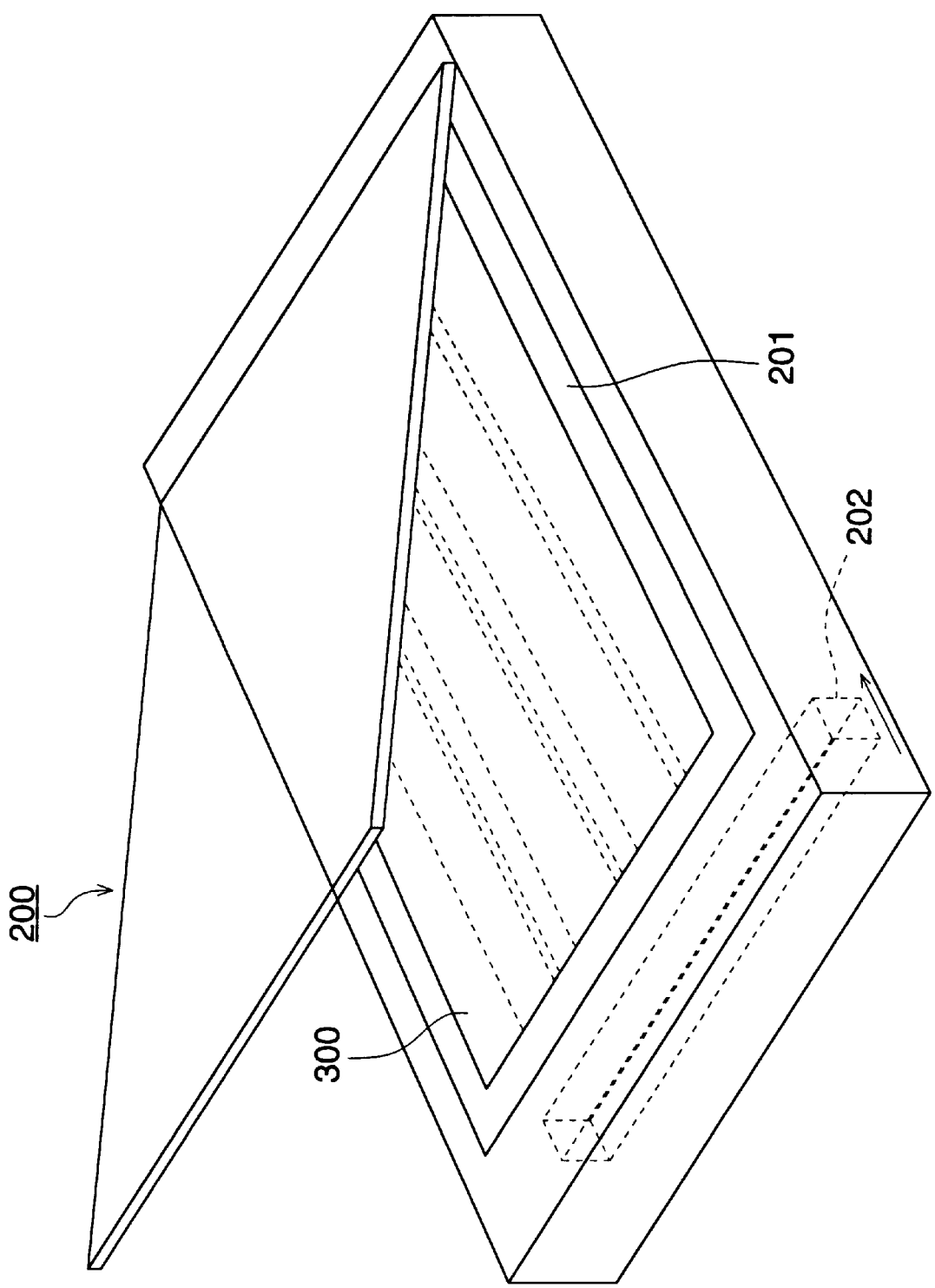
FIG. 19 is a structure diagram showing the structure of the eleventh embodiment of the invention.

When placing the print for correction on flat bed scanner 200 in FIG. 19, an adjustment is made for placing the print so that CCD 202 representing a reading means of the flat bed scanner 200 may move, and thereby the scanning direction (arrowed direction in FIG. 19) may agree with the longitudinal direction of the reference marker and the solid image area (S2 in FIG. 20).

In this case, execution of reading under the condition of adjusted placing of print for correction 300 (S3 in FIG. 20) makes a certain pixel of CCD 202 to take charge of reading concerning a certain exposure line in an image exposing apparatus. When the reference marker is referred to, a reading position on the print for correction 300 becomes clear, and placing of the pixel in an array light source is cleared.

Incidentally, since it is considered that there are aberrations in reading sensitivity of pixels of CCD 202, results of reading of width portions on solid image areas for each color on print for correction 300 are to be averaged.

Then, digital data of the results of reading obtained by flat bed scanner 200 are supplied to CPU 30 shown in FIG. 16 and others stated above. In CPU 30, the digital data are received, and a light emitting level for each pixel of each light emitting element row is calculated (S4 in FIG. 20). Then, CPU 30 compares the light emitting level thus detected with the level instructed for light emitting to calculate a value of correction for each pixel (S5 in FIG. 20). After that, the value of correction is stored in table 120.

Owing to this correction of an amount of exposure, a value of correction for each pixel of a light emitting element row for each recording color is obtained, and when the actual image data are used for conducting exposure, CPU 30 gives instruction for correction to HDC circuit 31.

Owing to this correction of an amount of exposure, by using the print for correction prepared by an image exposing apparatus capable of mixing light fluxes of each recording color by a light mixing means, a direction of each color can be made to be in parallel with others by arranging the direction of the total print for correction 300.

Incidentally, when exposing separately in the case of three recording colors without conducting light mixing with three light emitting element rows, it is not possible to read simultaneously each color accurately by flat bed scanner 200, because each light emitting element row is not in parallel with others perfectly. However, in the case of the present embodiment wherein light mixing is conducted, it is possible to read accurately and simultaneously with a flat bed scanner, because each solid image area for each color of the print for correction is in parallel with others.

(Twelfth embodiment)

In each embodiment stated above, it is possible to keep the intensity of light emitted from an array light source by measuring the intensity of light emitted from the array light source in the vicinity of a light mixing member and by applying feedback.

Figure 21:
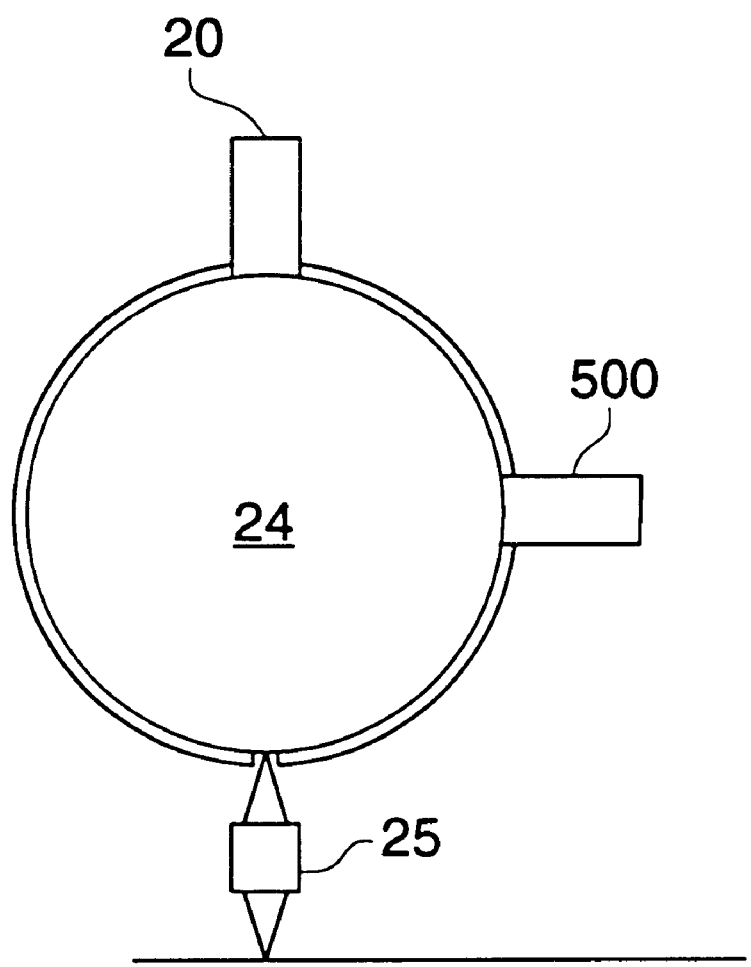
FIG. 21 is a flow chart showing operations in the twelfth embodiment of the invention.

FIG. 21 is a structure diagram showing the structure which uses the feedback. Though array light source 20 is shown here, it is also possible to use plural array light sources, in which a second emergent outlet is provided in addition to the ordinary emergent outlet, and array-shaped light-receiving element 500 is arranged. Feedback is to be applied to array light source 20 based on the results of detection by the light-receiving element 500. When the light-receiving element 500 is made to be the same as the array light source 20 in terms of the number of elements in this case, it is possible to realize individual feedback to each element of array light source 20, and to conduct stable exposure.

Incidentally, in this case, one incident inlet and two emergent outlets are provided on integrated disk column 24 so that the column is used as a light-splitting means. However, it is also possible to provide plural incident inlets, similarly to the embodiment stated above to make the column to be a light mixing/light splitting means.

Figure 22:
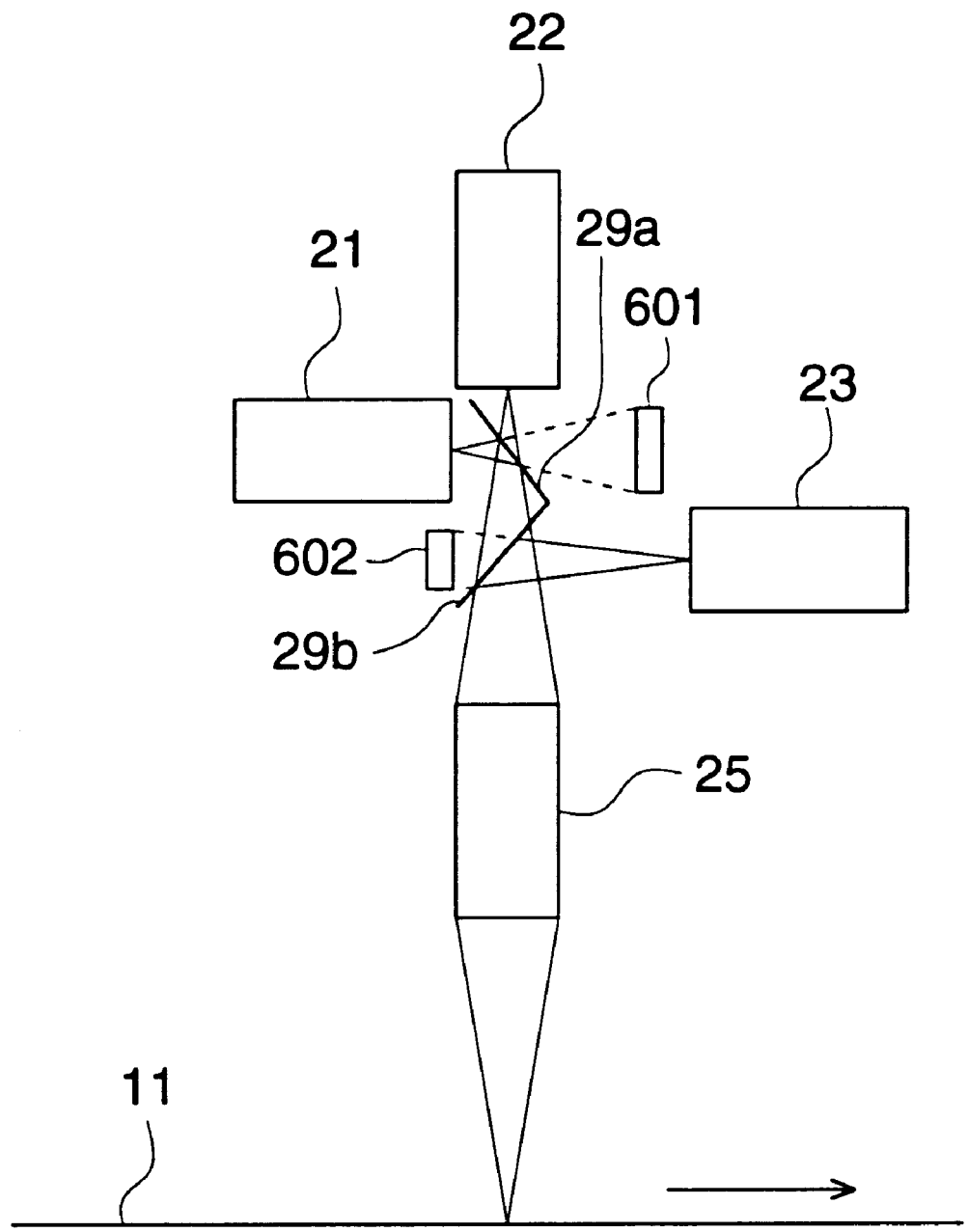
FIG. 22 is a flow chart showing operations in the twelfth embodiment of the invention.
Figure 23:
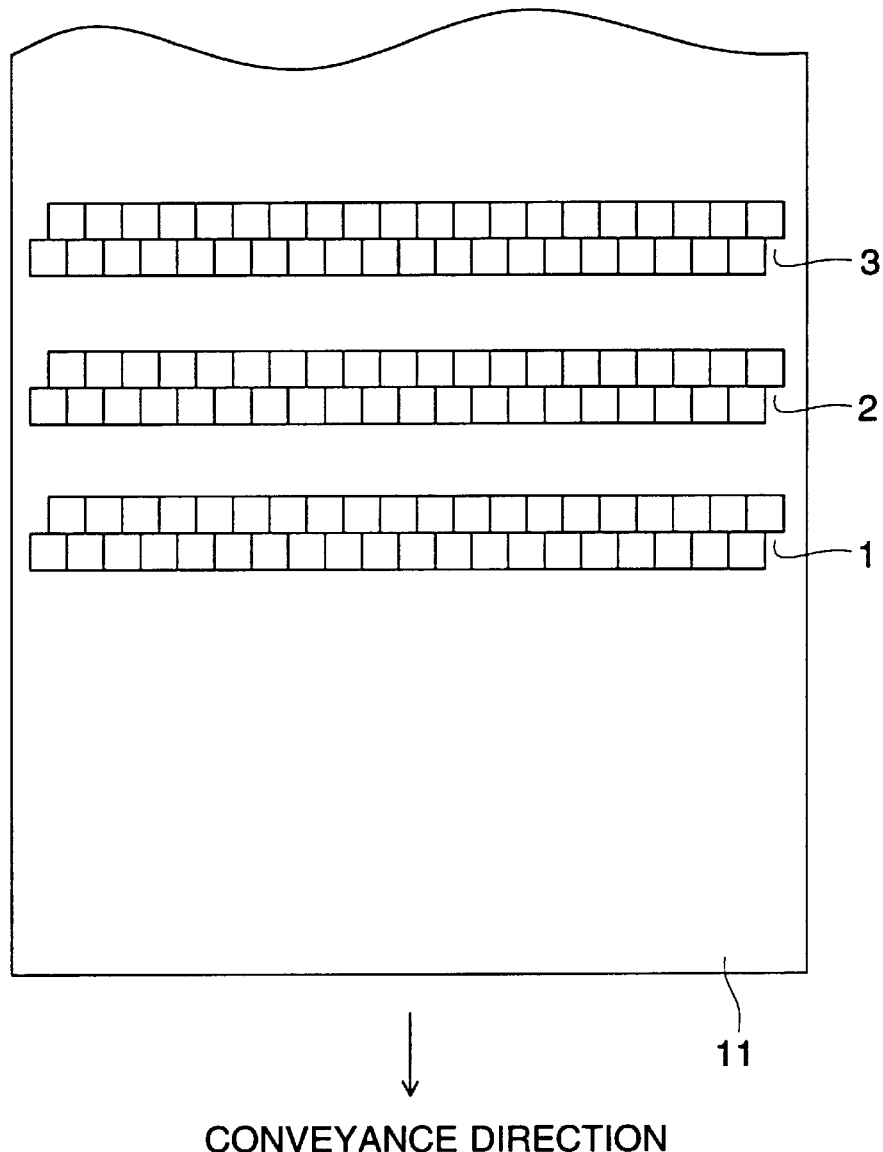
FIG. 23 is an illustrative diagram showing how an image is formed in a conventional image exposing apparatus.
Figure 24:
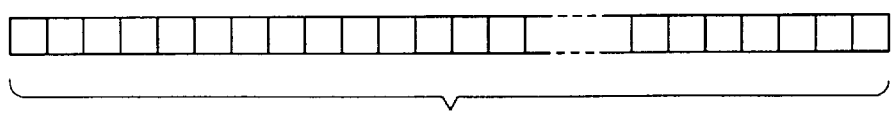
FIG. 24 is an illustrative diagram showing the structure of a light source to obtain an emergent light in a line having desired density.
Figure 25:
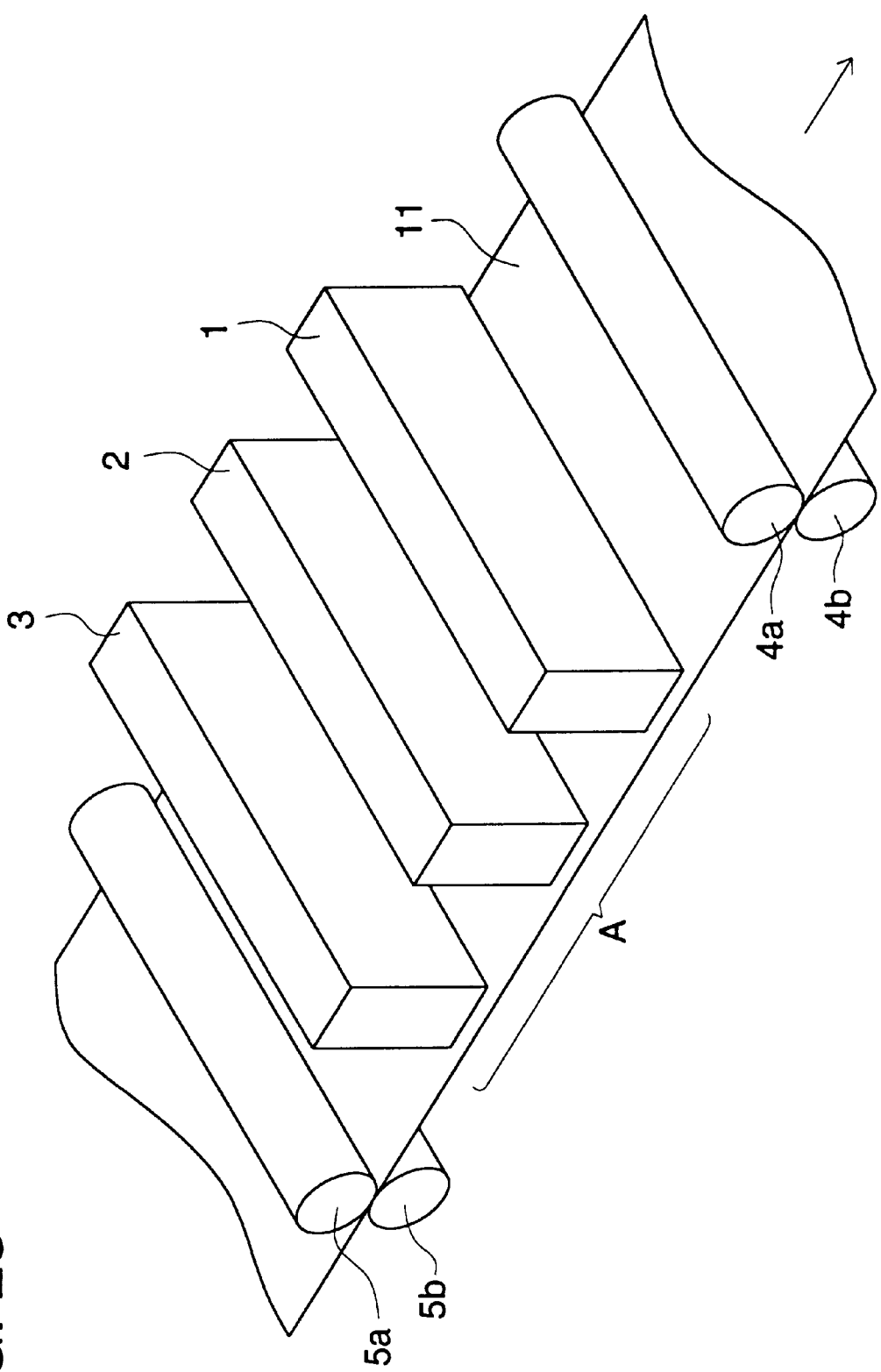
FIG. 25 is an illustrative diagram showing how an image is formed in a conventional image exposing apparatus.

FIG. 22 is a structure diagram showing another structure employing the feedback. In this case, array light sources 21–23 and dichroic mirrors 29a–29b are shown, and array-shaped light-receiving elements 601–602 each receiving light which is transmitted through or reflected on the dichroic mirror are arranged. Feedback is to be applied to the array light sources 21–23 based on the results of detection by the light-receiving elements 601–602.

In this case, the same operations can be conducted also by a dichroic prism, in addition to the dichroic mirror. Incidentally, light component which is not used for exposure is detected, because a white light source is used as an array light source. Thus, light loss caused by light receiving can be controlled.

When the light-receiving elements 601 and 602 are made to be the same as the array light sources 21–23 in terms of the number of elements in this case, it is possible to realize individual feedback to each element, and to conduct stable exposure.

(Other embodiment)

Incidentally, as a light mixing means, it is also possible to use, in addition to the foregoing, an optical lens having the refractive index like that of a fish eye lens in the direction to arrange array light sources.

What is claimed is:

1. An image exposing apparatus for imagewise exposing on a light-sensitive material, comprising:
   (a) a light emitting element row using a white light source; and
   (b) a wavelength selective optical member which transmits light or reflects light in accordance with a wavelength of the light, having at least one incident inlet and two or more emergent outlets for dividing light from the light emitting element row, and for making emergent light for exposure and emergent light for measurement of light emission intensity of the light emitting element row to emerge; and
   (c) light-receiving element row arranged on at least one of the emergent outlets for measuring light emission intensity of the light emitting element row.

2. An image exposing apparatus for imagewise exposing on a light-sensitive material, comprising:
   (a) a plurality of light emitting element rows;
   (b) a light mixing means for mixing light emitted from the plurality of light emitting element rows to form emergent light in a line in which rays of light are mixed on a same line; and
   (c) a moving means for moving at least one of the light-sensitive material and the light mixing means, so that an exposure line that is formed when the light-sensitive material is exposed to the emergent light in a line is moved in a direction having a directional component perpendicular to the exposure line, wherein the light mixing means comprises;
      a plurality of incident inlets for receiving light fluxes in plural rows,
      a mixing member for mixing light fluxes coming through the plurality of incident inlets in light transmissible substances or light diffusible substances, and
      an emergent outlet through which the mixed light fluxes emerge, and
      wherein the mixing member includes a plurality of disks.

3. The image exposing apparatus of claim 2, wherein the plurality of light emitting element rows each includes a plurality of light emitting elements, each of which is controlled independently for each pixel in terms of light emitting,
   wherein said plurality of light emitting element rows are provided for a plurality of colors corresponding to colors to be recorded.

4. The image exposing apparatus of claim 2, wherein the plurality of light emitting element rows each includes a light emitting means, wherein a single light emitting section and shutter means are combined, each of said single light emitting section and shutter means is controlled independently at a section corresponding to a pixel,
   wherein said plurality of light emitting element rows are provided for a plurality of colors corresponding to colors to be recorded.

5. The image exposing apparatus of claim 2, wherein the plurality of light emitting element rows each includes a plurality of light emitting elements, each of which is controlled independently for each pixel in terms of light emitting, wherein each of the plurality of light emitting element rows realizes emission of a plurality of colors corresponding to colors to be recorded, using a wavelength with which a wavelength selective optical member transmits light or reflects light selectively.

6. The image exposing apparatus of claim 2, wherein the plurality of light emitting element rows each includes a light emitting means wherein a single light emitting section and shutter means are combined, each of said single light emitting section and shutter means is controlled independently at a section corresponding to a pixel, wherein each of the plurality of light emitting element rows realizes emission of a plurality of colors corresponding to colors to be recorded, using a wavelength with which a wavelength selective optical member transmits light or reflects light selectively.

7. The image exposing apparatus of claim 2, wherein the plurality of light emitting element rows each includes a plurality of light emitting elements each of which is controlled independently for each pixel in terms of light emitting, wherein each of said plurality of light emitting element rows includes a light emitting element row for a same color to be recorded.

8. The image exposing apparatus of claim 2, wherein the plurality of light emitting element rows each includes a light emitting means wherein a single light emitting section and shutter means are combined, each of said single light emitting section and shutter means is controlled independently at a section corresponding to a pixel, wherein each of said plurality of light emitting element rows includes a light emitting element row for a same color to be recorded.

9. The image exposing apparatus of claim 2 further comprising:

a light transmitting means which causes light fluxes emitted from the plurality of light emitting element rows to transmit on incident inlets of the light mixing means; and an image forming means which causes emergent light diffused from an emergent outlet on the light mixing means to form images on the light-sensitive material.

10. The image exposing apparatus of claim 9, wherein chromatic aberration of a lens of the image forming means is within 800 $\mu$m between a longest wavelength and a shortest wavelength of the plurality of light emitting element rows.

11. An image exposing apparatus for imagewise exposing on a light-sensitive material, comprising:

(a) a plurality of light emitting element rows;

(b) a light mixing means for mixing light emitted from the plurality of light emitting element rows to form emergent light in a line in which rays of light are mixed on a same line; and (c) a moving means for moving at least one of the light-sensitive material and the light mixing means, so that an exposure line that is formed when the light-sensitive material is exposed to the emergent light in a line is moved in a direction having a directional component perpendicular to the exposure line, wherein the light mixing means comprises;

a plurality of incident inlets for receiving light fluxes in plural rows, a mixing member for mixing light fluxes coming through the plurality of incident inlets in light transmissible substances or light diffusible substances, and an emergent outlet through which the mixed light fluxes emerge, and wherein the mixing member includes a plurality of elliptical bodies each being formed to have the plurality of incident inlets and the emergent outlet, and said plurality of elliptical bodies are laminated one after the other.

12. The image exposing apparatus of claim 11, wherein the plurality of light emitting element rows each includes a plurality of light emitting elements, each of which is controlled independently for each pixel in terms of light emitting, wherein said plurality of light emitting element rows are provided for a plurality of colors corresponding to colors to be recorded.

13. The image exposing apparatus of claim 11, wherein the plurality of light emitting element rows each includes a light emitting means, wherein a single light emitting section and shutter means are combined, each of said single light emitting section and shutter means is controlled independently at a section corresponding to a pixel, wherein said plurality of light emitting element rows are provided for a plurality of colors corresponding to colors to be recorded.

14. The image exposing apparatus of claim 11, wherein the plurality of light emitting element rows each includes a plurality of light emitting elements, each of which is controlled independently for each pixel in terms of light emitting, wherein each of the plurality of light emitting element rows realizes emission of a plurality of colors corresponding to colors to be recorded, using a wavelength with which a wavelength selective optical member transmits light or reflects light selectively.

15. The image exposing apparatus of claim 11, wherein the plurality of light emitting element rows each includes a light emitting means wherein a single light emitting section and shutter means are combined, each of said single light emitting section and shutter means is controlled independently at a section corresponding to a pixel, wherein each of the plurality of light emitting element rows realizes emission of a plurality of colors corresponding to colors to be recorded, using a wavelength with which a wavelength selective optical member transmits light or reflects light selectively.

16. The image exposing apparatus of claim 11, wherein the plurality of light emitting element rows each includes a plurality of light emitting elements each of which is controlled independently for each pixel in terms of light emitting, wherein each of said plurality of light emitting element rows includes a light emitting element row for a same color to be recorded.

17. The image exposing apparatus of claim 11, wherein the plurality of light emitting element rows each includes a light emitting means wherein a single light emitting section and shutter means are combined, each of said single light emitting section and shutter means is controlled independently at a section corresponding to a pixel, wherein each of said plurality of light emitting element rows includes a light emitting element row for a same color to be recorded.

18. The image exposing apparatus of claim 11 further comprising:
   a light transmitting means which causes light fluxes emitted from the plurality of light emitting element rows to transmit on incident inlets of the light mixing means; and
   an image forming means which causes emergent light diffused from an emergent outlet on the light mixing means to form images on the light-sensitive material.

19. The image exposing apparatus of claim 18, wherein chromatic aberration of a lens of the image forming means is within 800 μm between a longest wavelength and a shortest wavelength of the plurality of light emitting element rows.

20. An image exposing apparatus for imagewise exposing on a light-sensitive material, comprising:
   (a) a plurality of light emitting element rows;
   (b) a light mixing means for mixing light emitted from the plurality of light emitting element rows to form emergent light in a line in which rays of light are mixed on a same line; and
   (c) a moving means for moving at least one of the light-sensitive material and the light mixing means, so that an exposure line that is formed when the light-sensitive material is exposed to the emergent light in a line is moved in a direction having a directional component perpendicular to the exposure line,
      wherein the light mixing means is a plurality of optical plates each having a plurality of incident inlets which receives light fluxes in plural rows, a mixing member which conducts propagation and mixing causing the plurality of light fluxes from the incident inlets to be subjected to total reflection on a boundary, and an emergent outlet through which the mixed light fluxes emerge, and
      wherein said plurality of optical plates are laminated one after the other.

21. The image exposing apparatus of claim 20, wherein the plurality of light emitting element rows each includes a plurality of light emitting elements, each of which is controlled independently for each pixel in terms of light emitting,
   wherein said plurality of light emitting element rows are provided for a plurality of colors corresponding to colors to be recorded.

22. The image exposing apparatus of claim 20, wherein the plurality of light emitting element rows each includes a light emitting means, wherein a single light emitting section and shutter means are combined, each of said single light emitting section and shutter means is controlled independently at a section corresponding to a pixel,
   wherein said plurality of light emitting element rows are provided for a plurality of colors corresponding to colors to be recorded.

23. The image exposing apparatus of claim 20, wherein the plurality of light emitting element rows each includes a plurality of light emitting elements, each of which is controlled independently for each pixel in terms of light emitting,
   wherein each of the plurality of light emitting element rows realizes emission of a plurality of colors corresponding to colors to be recorded, using a wavelength with which a wavelength selective optical member transmits light or reflects light selectively.

24. The image exposing apparatus of claim 20, wherein the plurality of light emitting element rows each includes a light emitting means wherein a single light emitting section and shutter means are combined, each of said single light emitting section and shutter means is controlled independently at a section corresponding to a pixel,
   wherein each of the plurality of light emitting element rows realizes emission of a plurality of colors corresponding to colors to be recorded, using a wavelength with which a wavelength selective optical member transmits light or reflects light selectively.

25. The image exposing apparatus of claim 20, wherein the plurality of light emitting element rows each includes a plurality of light emitting elements each of which is controlled independently for each pixel in terms of light emitting,
   wherein each of said plurality of light emitting element rows includes a light emitting element row for a same color to be recorded.

26. The image exposing apparatus of claim 20, wherein the plurality of light emitting element rows each includes a light emitting means wherein a single light emitting section and shutter means are combined, each of said single light emitting section and shutter means is controlled independently at a section corresponding to a pixel,
   wherein each of said plurality of light emitting element rows includes a light emitting element row for a same color to be recorded.

27. The image exposing apparatus of claim 20 further comprising:
   a light transmitting means which causes light fluxes emitted from the plurality of light emitting element rows to transmit on incident inlets of the light mixing means; and
   an image forming means which causes emergent light diffused from an emergent outlet on the light mixing means to form images on the light-sensitive material.

28. The image exposing apparatus of claim 27, wherein chromatic aberration of a lens of the image forming means is within 800 μm between a longest wavelength and a shortest wavelength of the plurality of light emitting element rows.

29. An image exposing apparatus for imagewise exposing on a light-sensitive material, comprising:
   (a) a plurality of light emitting element rows;
   (b) a light mixing means for mixing light emitted from the plurality of light emitting element rows to form emergent light in a line in which rays of light are mixed on a same line; and
   (c) a moving means for moving at least one of the light-sensitive material and the light mixing means, so that an exposure line that is formed when the light sensitive-material is exposed to the emergent light in a line is moved in a direction having a directional component perpendicular to the exposure line,
      wherein the light mixing means includes a dichroic prism and a compound eye lens,
      wherein the plurality of light emitting element rows each includes a plurality of light emitting elements, each of which is controlled independently for each pixel in terms of light emitting,
      wherein said plurality of light emitting element rows are provided for a plurality of colors corresponding to colors to be recorded, and
      wherein one of said plurality of light emitting element rows emitting a light flux for green color is arranged so that a number of times of transmission through or reflection on the dichroic prism of the light flux for green color is minimum among said plurality of light emitting rows.

30. The image exposing apparatus of claim 29, wherein one of said plurality of light emitting element rows, emitting a light flux for blue color is arranged so that a number of times of transmission through or reflection on the dichroic prism of the light flux for blue color is maximum among said plurality of light emitting element rows.

31. An image exposing apparatus for imagewise exposing on a light-sensitive material, comprising:

(a) a plurality of light emitting element rows;

(b) a light mixing means for mixing light emitted from the plurality of light emitting element rows to form emergent light in a line in which rays of light are mixed on a same line; and (c) a moving means for moving at least one of the light-sensitive material and the light mixing means, so that an exposure line that is formed when the light-sensitive material is exposed to the emergent light in a line is moved in a direction having a directional component perpendicular to the exposure line, wherein the light mixing means includes a dichroic prism and a compound eye lens, wherein the plurality of light emitting element rows each includes a light emitting means, wherein a single light emitting section and shutter means are combined, each of said single light emitting section and shutter means is controlled independently at a section corresponding to a pixel, wherein said plurality of light emitting rows are provided for a plurality of colors corresponding to colors to be recorded, and wherein one of said plurality of light emitting element rows emitting a light flux for green color is arranged so that a number of times of transmission through or reflection on the dichroic prism of the light flux for green color is minimum among said plurality of light emitting rows.

32. The image exposing apparatus of claim 31, wherein one of said plurality of light emitting element rows, emitting a light flux for blue color is arranged so that a number of times of transmission through or reflection on the dichroic prism of the light flux for blue color is maximum among said plurality of light emitting element rows.

33. An image exposing apparatus for imagewise exposing on a light-sensitive material, comprising:

(a) a plurality of light emitting element rows;

(b) a light mixing means for mixing light emitted from the plurality of light emitting element rows to form emergent light in a line in which rays of light are mixed on a same line; and (c) a moving means for moving at least one of the light-sensitive material and the light mixing means, so that an exposure line that is formed when the light sensitive material is exposed to the emergent light in a line is moved in a direction having a directional component perpendicular to the exposure line, wherein the light mixing means includes a dichroic prism and a compound eye lens, wherein the plurality of light emitting element rows each includes a plurality of light emitting elements, each of which is controlled independently for each pixel in terms of light emitting, wherein each of the plurality of light emitting element rows realizes emission of a plurality of colors corresponding to colors to be recorded, using a wavelength with which a wavelength selective optical member transmits light or reflects light selectively, and wherein one of said plurality of light emitting element rows emitting a light flux for green color is arranged so that a number of times of transmission through or reflection on the dichroic prism of the light flux for green color is minimum among said plurality of light emitting rows.

34. The image exposing apparatus of claim 33, wherein one of said plurality of light emitting element rows, emitting a light flux for blue color is arranged so that a number of times of transmission through or reflection on the dichroic prism of the light flux for blue color is maximum among said plurality of light emitting element rows.

35. An image exposing apparatus for imagewise exposing on a light-sensitive material, comprising:

(a) a plurality of light emitting element rows;

(b) a light mixing means for mixing light emitted from the plurality of light emitting element rows to form emergent light in a line in which rays of light are mixed on a same line; and (c) a moving means for moving at least one of the light-sensitive material and the light mixing means, so that an exposure line that is formed when the light-sensitive material is exposed to the emergent light in a line is moved in a direction having a directional component perpendicular to the exposure line, wherein the light mixing means includes a dichroic prism and a compound eye lens, wherein the plurality of light emitting element rows each includes a light emitting means, wherein a single light emitting section and shutter means are combined, each of said single light emitting section and shutter means is controlled independently at a section corresponding to a pixel, wherein each of the plurality of light emitting element rows realizes emission of a plurality of colors corresponding to colors to be recorded, using a wavelength with which a wavelength selective optical member transmits light or reflects light selectively, and wherein one of said plurality of light emitting element rows emitting a light flux for green color is arranged so that a number of times of transmission through or reflection on the dichroic prism of the light flux for green color is minimum among said plurality of light emitting rows.

36. The image exposing apparatus of claim 35, wherein one of said plurality of light emitting element rows, emitting a light flux for blue color is arranged so that a number of times of transmission through or reflection on the dichroic prism of the light flux for blue color is maximum among said plurality of light emitting element rows.

37. An image exposing apparatus for imagewise exposing on a light-sensitive material, comprising:

(a) a plurality of light emitting element rows;

(b) a light mixing means for mixing light emitted from the plurality of light emitting element rows to form emergent light in a line in which rays of light are mixed on a same line; and (c) a moving means for moving at least one of the light-sensitive material and the light mixing means, so that an exposure line that is formed when the light-sensitive material is exposed to the emergent light in a line is moved in a direction having a directional component perpendicular to the exposure line, wherein the light mixing means includes a dichroic prism and a compound eye lens, wherein the plurality of light emitting element rows each includes a plurality of light emitting elements, each of which is controlled independently for each pixel in terms of light emitting, wherein each of said plurality of light emitting element rows includes a light emitting element row for a same color to be recorded, and wherein one of said plurality of light emitting element rows emitting a light flux for green color is arranged so that a number of times of transmission through or reflection on the dichroic prism of the light flux for green color is minimum among said plurality of light emitting rows.

38. The image exposing apparatus of claim 37, wherein one of said plurality of light emitting element rows, emitting a light flux for blue color is arranged so that a number of times of transmission through or reflection on the dichroic prism of the light flux for blue color is maximum among said plurality of light emitting element rows.

39. An image exposing apparatus for imagewise exposing on a light-sensitive material, comprising:

(a) a plurality of light emitting element rows;

(b) a light mixing means for mixing light emitted from the plurality of light emitting element rows to form emergent light in a line in which rays of light are mixed on a same line; and (c) a moving means for moving at least one of the light-sensitive material and the light mixing means, so that an exposure line that is formed when the light-sensitive material is exposed to the emergent light in a line is moved in a direction having a directional component perpendicular to the exposure line, wherein the light mixing means includes a dichroic prism and a compound eye lens, wherein the plurality of light emitting element rows each includes a light emitting means, wherein a single light emitting section and shutter means are combined, each of said single light emitting section and shutter means is controlled independently at a section corresponding to a pixel, wherein each of said plurality of light emitting element rows includes a light emitting element row for a same color to be recorded, and wherein one of said plurality of light emitting element rows emitting a light flux for green color is arranged so that a number of times of transmission through or reflection on the dichroic prism of the light flux for green color is minimum among said plurality of light emitting rows.

40. The image exposing apparatus of claim 39, wherein one of said plurality of light emitting element rows, emitting a light flux for blue color is arranged so that a number of times of transmission through or reflection on the dichroic prism of the light flux for blue color is maximum among said plurality of light emitting element rows.

* * * * *